United States Patent
Zhang et al.

(10) Patent No.: US 12,356,395 B2
(45) Date of Patent: Jul. 8, 2025

(54) SELF-INTERFERENCE MEASUREMENT REPORT

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 401 days.

(21) Appl. No.: 17/819,604

(22) Filed: Aug. 12, 2022

(65) Prior Publication Data
US 2024/0057073 A1    Feb. 15, 2024

(51) Int. Cl.
*H04W 72/1268*    (2023.01)
*H04W 72/23*    (2023.01)
*H04W 72/542*    (2023.01)

(52) U.S. Cl.
CPC ....... *H04W 72/1268* (2013.01); *H04W 72/23* (2023.01); *H04W 72/542* (2023.01)

(58) Field of Classification Search
None
See application file for complete search history.

(56) References Cited

U.S. PATENT DOCUMENTS

| | | | |
|---|---|---|---|
| 2020/0313779 A1* | 10/2020 | Kim | H04B 17/24 |
| 2021/0329473 A1 | 10/2021 | Zhang et al. | |
| 2021/0368369 A1 | 11/2021 | Zhang et al. | |
| 2021/0409097 A1 | 12/2021 | Zhang et al. | |
| 2022/0216976 A1* | 7/2022 | Zhang | H04L 5/0073 |
| 2024/0031044 A1* | 1/2024 | Kim | H04L 5/0048 |

FOREIGN PATENT DOCUMENTS

| | | |
|---|---|---|
| EP | 4164147 A1 | 4/2023 |
| WO | 2022050554 A1 | 3/2022 |
| WO | 2022160204 A1 | 8/2022 |

OTHER PUBLICATIONS

International Search Report and Written Opinion—PCT/US2023/029445—ISA/EPO—Nov. 3, 2023.

* cited by examiner

*Primary Examiner* — Walter J Divito
(74) *Attorney, Agent, or Firm* — QUALCOMM Incorporated

(57) ABSTRACT

The UE in a FD operation may receive scheduling information including timing information for reporting a self-interference measurement, and transmit a self-interference measurement report including the self-interference measurement based on the scheduling information received from a network node. The UE may transmit a request for the self-interference measurement report to the network node prior to receiving the scheduling information.

29 Claims, 14 Drawing Sheets

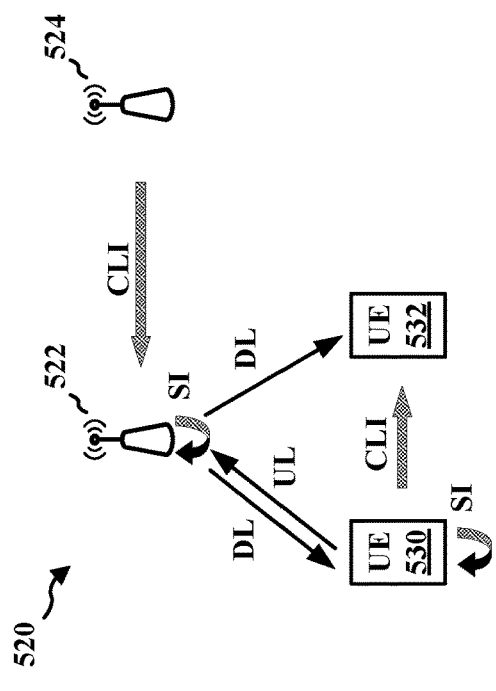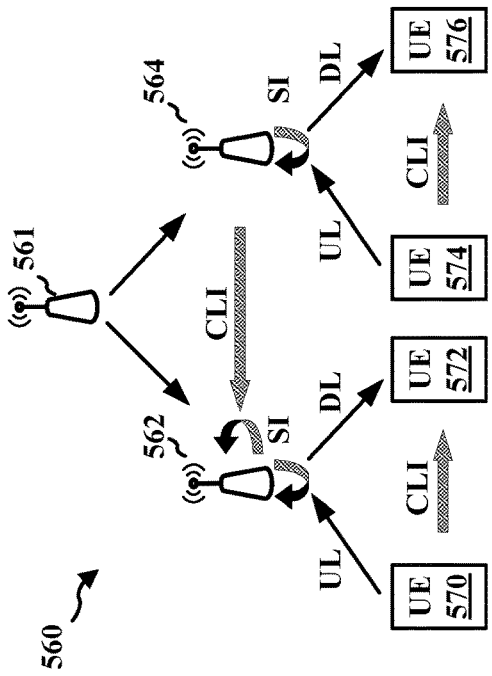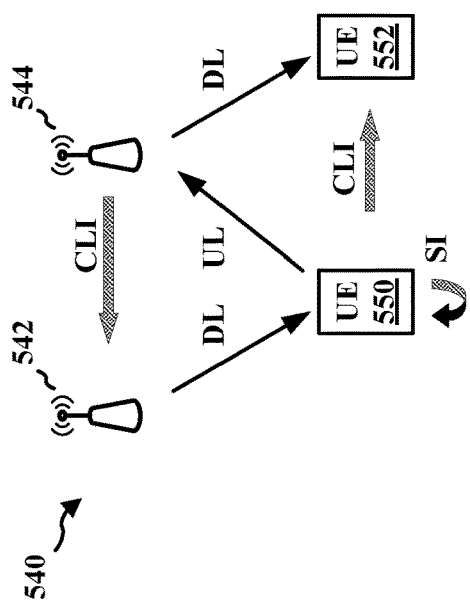

SELF-INTERFERENCE MEASUREMENT REPORT

TECHNICAL FIELD

The present disclosure relates generally to communication systems, and more particularly, to wireless communication including network configuration and/or user equipment (UE) request of a self-interference measurement report at the UE side.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a user equipment (UE) configured to receive scheduling information including timing information for reporting a self-interference measurement, and transmit a self-interference measurement report including the self-interference measurement based on the scheduling information received from a network node.

In an aspect of the disclosure, a method, a computer-readable medium, and an apparatus are provided. The apparatus may include a network node configured to transmit scheduling information for a UE, scheduling information including timing information for reporting a self-interference measurement, and receive a self-interference measurement report including the self-interference measurement based on the scheduling information received from the network node.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIGS. 5A, 5B, 5C, and 5D are examples of FD deployment of wireless communications.

DETAILED DESCRIPTION

Figure 1:
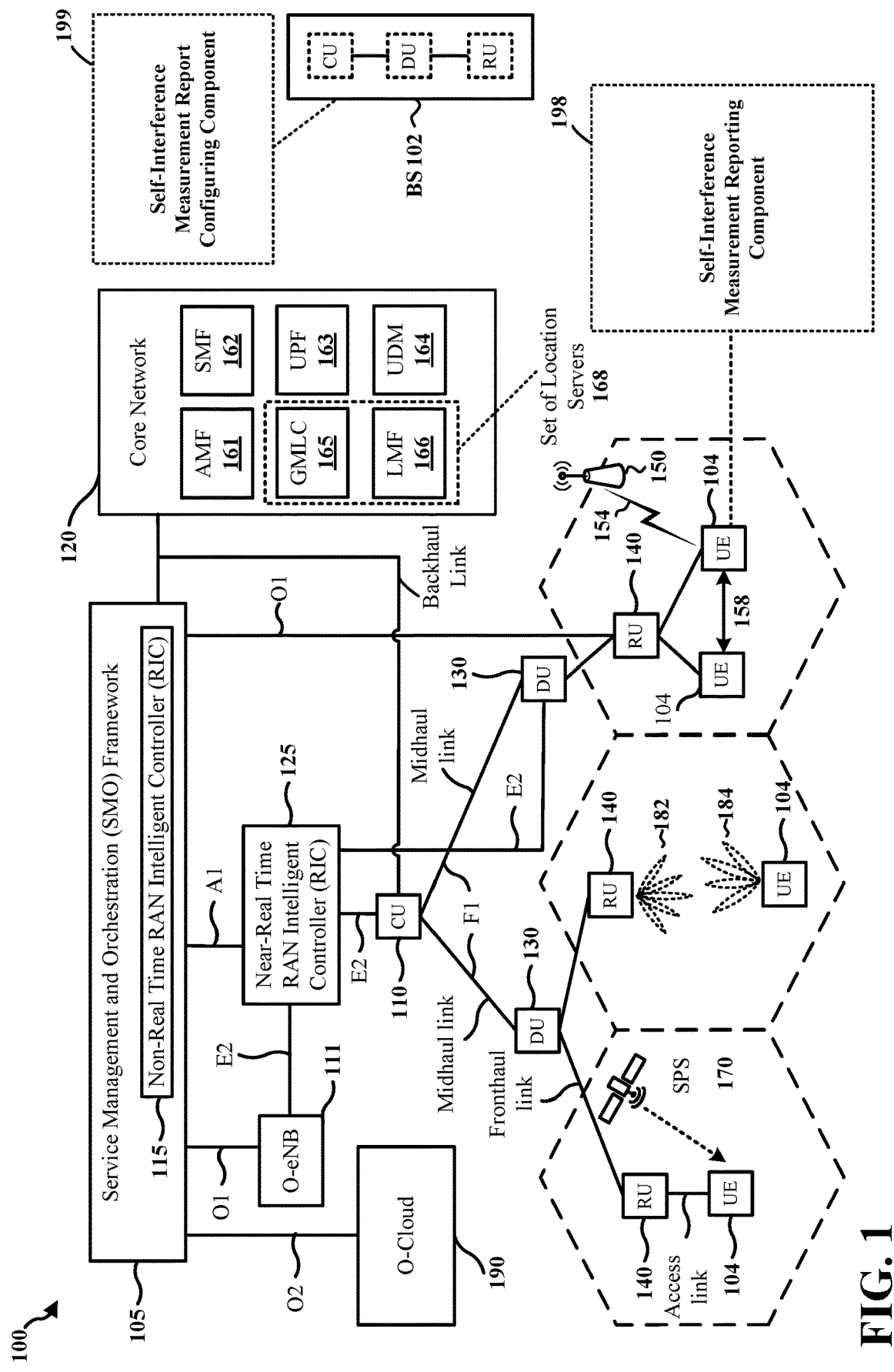
FIG. 1 is a diagram illustrating an example of a wireless communications system and an access network.

Network may instruct a user equipment (UE) operating in a full duplex (FD) mode to obtain and send a self-interference measurement report to the network node. In some aspects of the current disclosure, the instruction may include a timing information for reporting the self-interference measurement report in a scheduling information for an uplink transmission. The UE may be configured to receive the scheduling information including the timing information for reporting a self-interference measurement, and transmit the self-interference measurement report including the self-interference measurement based on the scheduling information. The network may reduce or save the communication overhead by instructing the self-interference measurement report using the scheduling information associated with the uplink transmission. Furthermore, the UE may send a request for the self-interference measurement report to initiate the self-interference measurement report.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a self-interference measurement reporting component 198 configured to receive scheduling information including timing information for reporting a self-interference measurement, and transmit a self-interference measurement report including the self-interference measurement based on the scheduling information received from a network node. In certain aspects, the base station 102 may include a self-interference measurement report configuring component 199 configured to transmit scheduling information for a UE, scheduling information including timing information for reporting a self-interference measurement, and receive a self-interference measurement report including the self-interference measurement based on the scheduling information received from the network node. Although the following description may be focused on 5G NR, the concepts described herein may be applicable to other similar areas, such as LTE, LTE-A, CDMA, GSM, and other wireless technologies.

Figure 2:
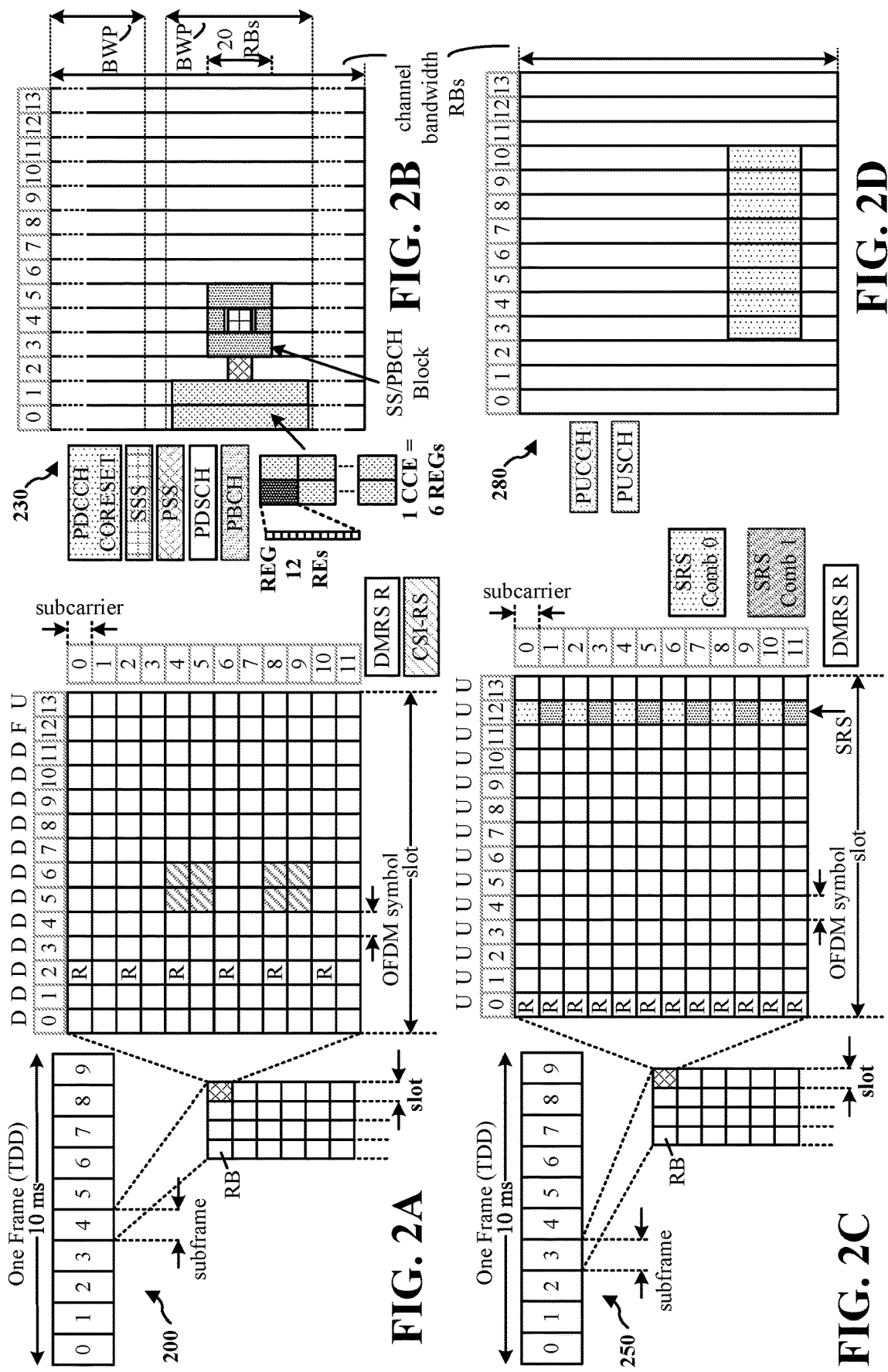
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15[kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
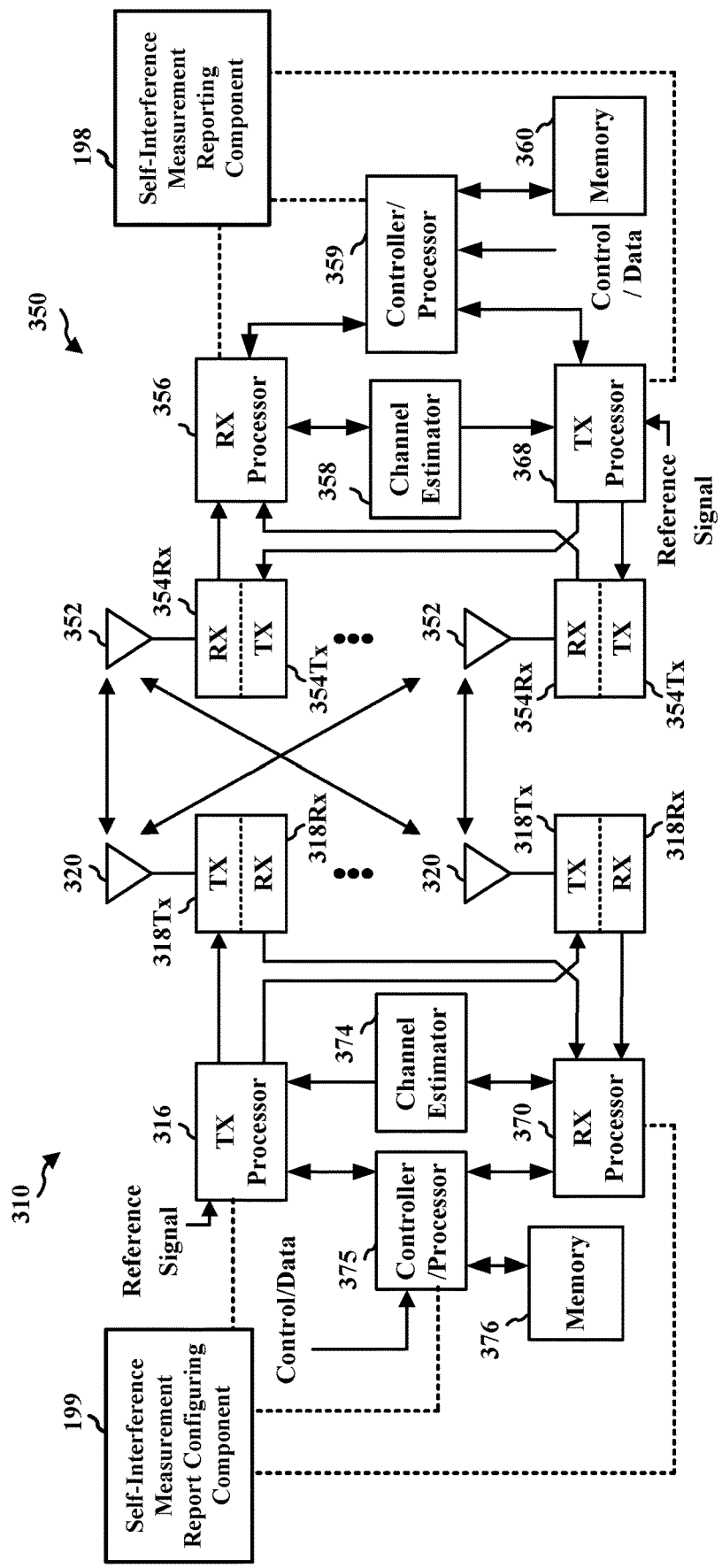
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the self-interference measurement reporting component 198 of FIG. 1. At least one of the TX processor 316, the RX processor 370, and the controller/processor 375 may be configured to perform aspects in connection with the self-interference measurement report configuring component 199 of FIG. 1.

In some aspects, at least one base station and one or more UE may support various duplex modes of communications, including a full duplex (FD) mode and a half duplex (HD) mode. FD mode may refer to simultaneous communications of one or more uplink (UL) transmissions or one or more downlink (DL) communications at a base station or a UE that may be associated with various aspects of procedures within the same frequency, different frequency sub-bands, or partially overlap in the frequency domain. HD mode may support transmission or reception of information in one direction at a time without overlapping uplink and downlink communication.

In FD mode, at least one base station and one or more UEs may simultaneously (e.g., overlapping at least partially in time) transmit and receive UL/DL communications. In one example, a base station in FD mode and a UE in FD mode may simultaneously transmit and receive UL/DL communications. That is, the base station may send a DL transmission to the UE simultaneously with the UE sending an UL transmission to the base station. In another example, a base station in FD mode may simultaneously transmit and receive UL/DL communications to and from multiple UEs. That is, the base station may send a DL transmission to a first UE simultaneously with receiving an UL transmission from a second UE. In yet another example, a UE in FD mode may receive a DL transmission from a first base station simultaneously with sending an UL transmission to a second base station. That is, the UE in FD mode may receive a DL transmission from a first base station simultaneously with sending an UL transmission to a second base station.

The FD capability may be present at the base station or the UEs. That is, at least one of the base station or the UE may have the capability to support FD mode communication. For example, a UE may have multiple panels facing different directions, e.g., two antennas facing the front and two antennas facing the back of the UE, and the front-facing antenna panels may be configured to transmit/receive beams different from the beams transmitted/received via the rear-facing antenna panels. Accordingly, the UE may have the capability to support UL transmission from one antenna panel and DL reception in another antenna panel simultaneously. For another example, a base station may have the capability to support UL reception through forming a first beam at a first set of antenna panels and support DL transmission through forming a second beam at a second set of antenna panels simultaneously.

In some aspects, the FD capability of a the one or more UEs or the base stations, may be conditional on various factors, such as interference, beam separation, antenna separation, isolation, etc. In one aspect, the one or more UEs or the base stations may support FD mode communication based on a capability to perform beam separation. For example, the base station may determine that a UE may support FD mode communication based on the capability of the UE to separate the UL beam and the DL beam. In another aspect, the one or more UEs or the base stations may support FD mode communication based on self-interference between the DL and/or UL transmissions. That is, the self-interference caused by the simultaneous transmission of the DL/UL signals may impede the UE's capacity to support FD mode communication. In yet another aspect, a clutter echo caused by reflections of the radio signals at surfaces or obstructions may affect the UE's capacity to support FD mode communication.

FD mode communication may reduce the network latency and increase spectral efficiency through the exchange of uplink and downlink communication at overlapping times and in a same frequency band. For example, a UE or a base station may receive a signal in without waiting until the end of a transmission, which may reduce latency. FD communication may also enable an increase in spectrum efficiency, which refers to the information rate that can be exchanged over a given spectrum or bandwidth, and improve the efficiency of the resource utilization. A base station may operate in a FD mode, which may enable an increase in spectral efficiency per cell. Individual UEs may operate in a FD mode, which may enable an increase in spectral efficiency per UE.

Figure 4A:
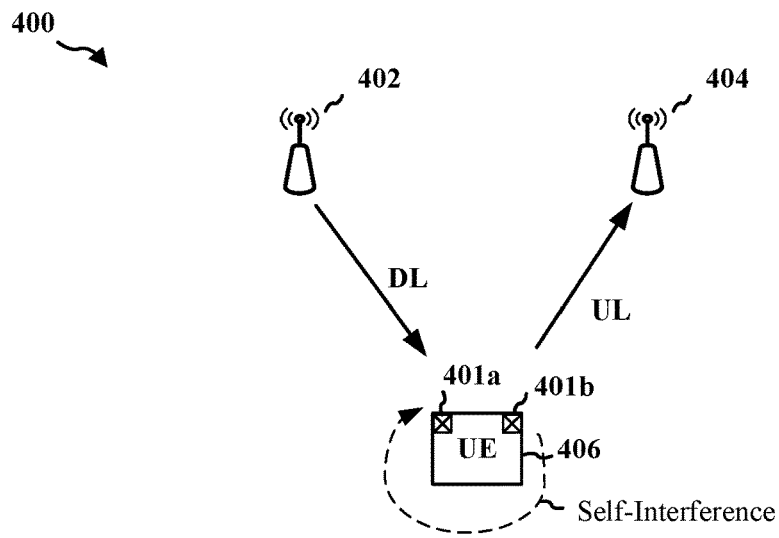
FIGS. 4A, 4B, and 4C are examples of different types of full-duplex (FD) mode of wireless communications.
Figure 4B:
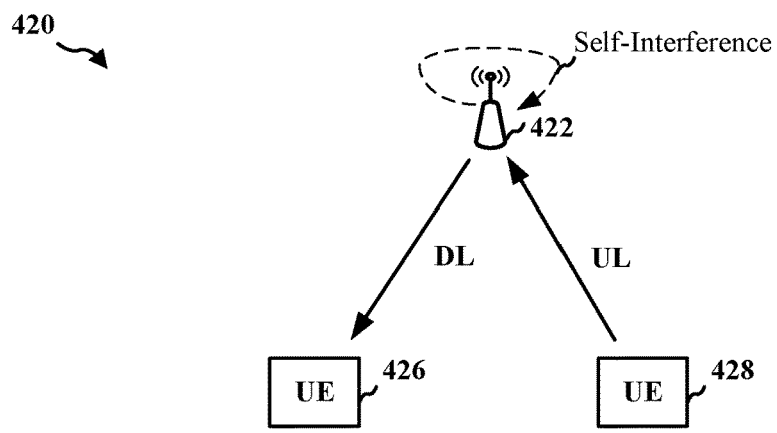
Figure 4C:
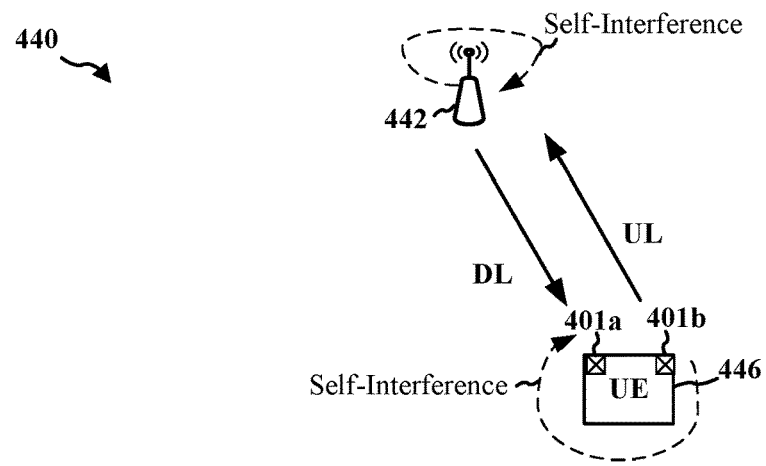

FIGS. 4A, 4B, and 4C are examples 400, 420, and 440 of different types of FD mode of wireless communications. Due to the simultaneous Tx/Rx nature of full-duplex communication, a UE or a network node may experience self-interference caused by signal leakage from its local transmitter to its local receiver. In addition, the UE or network node may also experience interference from other devices, such as transmissions from a second UE or a second network node. Such interference (e.g., self-interference or interference caused by other devices) may impact the quality of the communication, or even lead to a loss of information. The first example 400 illustrates a first network node 402 and a second network node 404, and a UE 406 in FD mode. The first network node 402 and the second network node 404 may be in FD mode or a HD mode. The UE 406 may have the FD capability to simultaneously communicate UL/DL transmissions with the first network node 402 and the second network node 404. For example, the UE 406 may receive the DL transmission from the first network node 402 and transmit a UL transmission to the second network node 404 simultaneously. The UE 406 may receive the DL transmission from the first network node 402 via a first antenna panel 401a and send the UL transmissions to the second network node 404 via a second antenna panel 401b. Here, the first network node 402 may be a first TRP, and the second network node 404 may be a second TRP. The UE 406 may experience self-interference as a result of receiving at least a portion of the uplink signal when receiving the downlink signal, e.g., the UE's uplink signal to the second network node 404 may leak to (e.g., be received by) the UE's receiver when the UE 406 is attempting to receive the signal from the other network node. The UE 406 may experience additional interference due to signals from other devices.

The second example 420 illustrates a network node 422 operating in a FD mode with a first UE 426 and a second UE 428. In one aspect, the network node 422 in FD mode may simultaneously (e.g., at least partially overlapping in time) receive UL signals from the second UE 428 while transmitting DL transmissions to the first UE 426 in a FD mode. The first UE 426 and the second UE 428 may also operate in a FD mode or may operate in a HD mode. For example, the network node 422 may transmit a DL transmission to the first UE 426 and receive the UL transmission from the second UE 428 simultaneously. The network node 422 may transmit the DL transmission to the first UE 426 via a DL beam and receive the UL transmissions from the second UE 428 via the UL beam. The network node 422 may experience self-interference as a result of receiving at least a portion of the downlink signal when receiving the uplink signal, e.g., the network node's downlink signal to first UE 426 may leak to (e.g., be received by) the network node's receiver when the network node 422 is attempting to receive the signal from the other UE. The network node 422 may experience additional interference due to signals from other devices.

The third example 440 illustrates a network node 442 in FD mode and a UE 446 in FD mode. In one aspect, the network node 442 in FD mode may simultaneously (e.g., at least partially overlapping in time) receive uplink transmissions while transmitting downlink transmissions with the UE 446. In one aspect, the network node 442 and the UE 446 may support FD mode. For example, the network node 442 may transmit a DL transmission to the UE 446 and receive the UL transmission from the UE 446 simultaneously. For example, the network node 442 may transmit the DL transmission to the UE 446 via a DL beam and receive the UL transmissions from the UE 446 via the UL beam. The network node 442 and/or the UE 446 may experience self-interference, e.g., as described in connection with the examples in FIGS. 4A and 4B.

FIGS. 5A, 5B, 5C, and 5D are examples of FD deployment of wireless communications. The FD deployment may include various combination of at least one of FD network nodes or HD network nodes configured with at least one of FD UEs or HD UEs. At least one network node or UE may experience interferences, e.g., a cross-link interference (CLI) or a self-interference. In one aspect, the CLI may occur between more than one network entities (e.g., the network nodes or the UEs) when one network entity sends a Tx beam while another network entity is receiving an Rx beam. In another aspect, the self-interference may occur at one network entity (e.g., the network nodes or the UEs) operating in FD mode when the network entity sends a Tx beam while receiving an Rx beam. The transmitted signal may cause the self-interference to the received signal. Such interferences may be more common when transmitting or receiving resources in FR2, as many wireless devices may use those resources. Such interferences may prevent a receiving device from successfully decoding a received signal.

FIG. 5A is a first FD deployment 500 including network nodes (e.g., a first network node 502 and a second network node 504) and UEs (e.g., a first UE 510, a second UE 512, a third UE 514, and a fourth UE 516). The first FD deployment 500 may illustrate an example of a wireless communications system including a first cell having the first network node 502 in communication with the first UE 510 and the second UE 512 that may experience CLI while the first network node 502 operates in the FD mode, and a second cell having the second network node 504 in communication with the third UE 514 and the fourth UE 516 that may experience CLI while the second network node 504 operates in the FD mode.

In one aspect, each of the first UE 510 and the second UE 512 may be HD UEs and the first network node 502 may be a FD network node. The first network node 502 may include one or more TRPs. The first network node 502 may have at least two antenna panels: a first antenna panel configured to communicate with the first UE 510 and a second antenna panel configured to communicate with the second UE 512. Each of the antenna panels may operate independently of one another. The first network node 502 may be configured to conduct simultaneous communication with the first UE 510 and the second UE 512 (i.e., the communication transmissions have overlapping resources). In one example, the first network node 502 may conduct an Rx by receiving a signal from the first UE 510 and may simultaneously conduct an Rx by receiving a signal from second UE 512 (i.e., simultaneous reception mode). In another example, the first network node 502 may conduct a Tx by transmitting a signal to the first UE 510 and may simultaneously conduct a Tx by transmitting a signal to the second UE 512 (e.g., simultaneous transmission mode). In another example, the first network node 502 may conduct a Tx by transmitting a signal to the first UE 510 and may simultaneously conduct an Rx by receiving a signal from the second UE 512. In another example, the first network node 502 may conduct an Rx by receiving a signal from the first UE 510 and may simultaneously conduct a Tx by transmitting a signal to the second UE 512. In case the first network node 502 conducts the Rx by receiving the signal from the first UE 510 and simultaneously conducts the Tx by transmitting the signal to the second UE 512, the first network node 502 may experience a self-interference from the Rx and the Tx, and the second UE 512 may experience a CLI from the uplink transmission by the first UE 510.

In another aspect, each of the third UE 514 and the fourth UE 516 may be HD UEs and the second network node 504 may be a FD network node. The second network node 504 may include one or more TRPs. The second network node 504 may have at least two antenna panels: a first antenna panel configured to communicate with the third UE 514 and a second antenna panel configured to communicate with the fourth UE 516. Each of the antenna panels may operate independently of one another. The second network node 504 may be configured to conduct simultaneous communication with the third UE 514 and the fourth UE 516 (i.e., the communication transmissions have overlapping resources). In one example, the second network node 504 may conduct an Rx by receiving a signal from the third UE 514 and may simultaneously conduct an Rx by receiving a signal from fourth UE 516 (i.e., simultaneous reception mode). In another example, the second network node 504 may conduct a Tx by transmitting a signal to the third UE 514 and may simultaneously conduct a Tx by transmitting a signal to the fourth UE 516 (e.g., simultaneous transmission mode). In another example, the second network node 504 may conduct a Tx by transmitting a signal to the third UE 514 and may simultaneously conduct an Rx by receiving a signal from the fourth UE 516. In another example, the second network node 504 may conduct an Rx by receiving a signal from the third UE 514 and may simultaneously conduct a Tx by transmitting a signal to the fourth UE 516. In case the second network node 504 conducts the Rx by receiving the signal from the third UE 514 and simultaneously conducts the Tx by transmitting the signal to the fourth UE 516, the second network node 504 may experience a self-interference from the Rx and the Tx, and the fourth UE 516 may experience a CLI from the uplink transmission by the third UE 514.

FIG. 5B is a second FD deployment 520 including FD network nodes (e.g., a first network node 522 and a second network node 524) and FD UEs (e.g., a first UE 530 and a second UE 532). The second FD deployment 520 may illustrate an example of a wireless communications system including a first cell having the first network node 522 in communication with the first UE 530 and the second UE 532 that may experience CLI while the first network node 522 operates in the FD mode. The first network node 522 may experience CLI from the second network node 524.

The first UE 530 may be a FD UE, the second UE 532 may be a HD UE, and the first network node 522 may be a FD network node. The first network node 522 may include one or more TRPs. The first network node 522 may have at least three antenna panels: a first and second antenna panels configured to communicate with the first UE 530 and a third antenna panel configured to communicate with the second UE 532. Each of the antenna panels may operate independently of one another. The first network node 522 may be configured to conduct simultaneous communication with the first UE 530 and the second UE 532 (i.e., the communication transmissions have overlapping resources). In one example, the first network node 522 may conduct Rx and Tx by receiving a signal from the first UE 530 and transmitting another signal to the first UE 530 (e.g., FD mode), and may simultaneously conduct an Rx by receiving a signal from second UE 532 (i.e., simultaneous reception mode). In another example, the first network node 522 may conduct Rx and Tx by receiving a signal from the first UE 530 and transmitting another signal to the first UE 530 (e.g., FD mode), and may simultaneously conduct a Tx by transmitting a signal to second UE 532 (e.g., simultaneous transmission mode). The first network node 522 may experience a self-interference from the overlapping Rx and Tx, and the second UE 532 may experience a CLI from the uplink transmission by the first UE 530. Furthermore, the first UE 530 operating in FD mode may experience a self-interference from the overlapping Rx and Tx at the first UE 530 side.

FIG. 5C is a third FD deployment 540 including HD network nodes (e.g., a first network node 542) and FD UEs (e.g., a first UE 550). For example, the first UE 550 may be connected to the first network node 542 and a second network node 544 with a multi-TRP (mTRP) configuration. Here, the first network node 542 and the second network node 544 may be TRPs, and the first UE 550 may be configured to communicate with the network (e.g., the base station) through multiple TRPs including the first network node 542 and the second network node 544.

The first UE 550 may have at least two antenna panels: a first antenna panel configured to communicate with the first network node 542 and a second antenna panel configured to communicate with the second network node 544. The first UE 550 may concurrently transmit an uplink signal to the second network node 544 while receiving a downlink signal from the first network node 542. The first UE 550 may experience self-interference as a result of the first signal and the second signal being communicated simultaneously. For example, the uplink signal transmitted by the UE's transmitter may be leaked to (or be received by) the UE's receiver, and the first UE 550 may experience self-interference at the receiving antenna receiving the downlink signal from first network node 542, the self-interference caused by some of the uplink signal transmitted to the second network node 544. The first UE 550 may cause additional interference (CLI) for the second UE 552.

The second network node 544 may have at least two antenna panels: a first antenna panel configured to communicate with the first UE 550 and a second antenna panel configured to communicate with the second UE 552. Each of the antenna panels may operate independently of one another. The second network node 544 may be configured to conduct simultaneous communication with the first UE 550 and the second UE 552 (i.e., the communication transmissions have overlapping resources). In one example, the second network node 544 may conduct an Rx by receiving a signal from the first UE 550 and may simultaneously conduct a Tx by transmitting a signal to the second UE 552. In case the second network node 544 conducts the Rx by receiving the signal from the first UE 550 and simultaneously conducts the Tx by transmitting the signal to the second UE 552, the second network node 544 may experience a self-interference from the Rx and the Tx, and the second UE 552 may experience a CLI from the uplink transmission by the first UE 550.

FIG. 5D is a fourth FD deployment 560 including FD IAB nodes, e.g., a first IAB node 562 and a second IAB node 564. The fourth FD deployment 560 may illustrate an example of a wireless communications system including the first IAB node 562 in communication with the first UE 570 and the second UE 572 that may experience CLI while the first IAB node 562 operates in the FD mode, and a second cell having the second IAB node 564 in communication with the third UE 574 and the fourth UE 576 that may experience CLI while the second IAB node 564 operates in the FD mode. In one aspect, each of the first UE 570 and the second UE 572 may be HD UEs and the first IAB node 562 may be a FD IAB, and each of the third UE 574 and the fourth UE 576 may be HD UEs and the second IAB node 564 may be a FD IAB. The first IAB node 562 and the second IAB node 564 may be connected to a parent node 561 (e.g., a base station or a parent IAB node), and the first IAB node 562 may experience CLI from the second IAB node 564.

The first IAB node 562 and the second IAB node 564 may be a component of a base station. The first IAB node 562 and the second IAB node 564 may have an IAB mobile termination (IAB MT) that may be configured to communicate with the parent node 561 and has an IAB DU that may be configured to communicate with its child UE (e.g., the first UE 570, the second UE 572, the third UE 574, or the fourth UE 576). Each of IAB MT and IAB DU may have an antenna panel that operates independently of the other antenna panel.

The first IAB node 562 may be configured to conduct simultaneous operation of its child and parent links. In one aspect, the first IAB node 562 may conduct an Rx with its IAB MT by receiving a signal from the parent node 561 and simultaneously conduct an Rx with its IAB DU by receiving a signal from its child UE (e.g., the first UE 570) (i.e., simultaneous reception mode). In another aspect, the first IAB node 562 may conduct a Tx with its IAB MT by transmitting a signal to the parent node 561 and may simultaneously conduct a Tx with its IAB DU by transmitting a signal to its child UE (e.g., the first UE 570) (e.g., simultaneous transmission mode). In another aspect, the first IAB node 562 may conduct a Tx with its IAB MT by transmitting a signal to the parent node 561 and may simultaneously conduct an Rx with its IAB DU by receiving a signal from its child UE (e.g., the first UE 570). In another aspect, the first IAB node 562 may conduct an Rx with its IAB MT by receiving a signal from the parent node 561 and may simultaneously conduct a Tx with its IAB DU by transmitting a signal to its child UE (e.g., the first UE 570). Transmissions that occur simultaneously may have overlapping resources (e.g., overlapping time periods and overlapping frequency bands).

In one aspect, the first IAB node 562 may support simultaneous operation of each of the aforementioned four aspects of FD transmission. When the first IAB node 562 is in simultaneous transmission mode or simultaneous reception mode, the first IAB node 562 does not experience self-interference. However, when one panel of the first IAB node 562 is operating in Tx mode while another panel of the first IAB node 562 is operating in Rx mode, the first IAB node 562 may experience self-interference. For example, IAB MT may operate in Rx mode by receiving signal from the parent node 561 while IAB DU operates in Tx mode by transmitting signal to its child UE (e.g., the first UE 570). Such a condition may occur when the first IAB node 562 acts as an intermediary layer between its child UE (e.g., the first UE 570) and the parent node 561 when the child UE (e.g., the first UE 570) performs a DL Rx from the parent node 561 via the first IAB node 562. If the IAB MT receives the signal from the parent node 561 at the same time that the IAB DU transmits the signal to its child UE (e.g., the first UE 570), a self-interference may occur at the first IAB node 562. In other words, the transmitted signal from the IAB DU to its child UE (e.g., the first UE 570) may interfere with the first IAB node 562 successfully decoding the received signal from the parent node 561 at the IAB MT.

In another aspect, the first IAB node 562, e.g., the IAB DU of the first IAB node 562, may have at least two antenna panels: a first antenna panel configured to communicate with the first UE 570 and a second antenna panel configured to communicate with the second UE 572. Each of the antenna panels may operate independently of one another. The first IAB node 562 may be configured to conduct simultaneous communication with the first UE 570 and the second UE 572 (i.e., the communication transmissions have overlapping resources). In one example, the first IAB node 562 may conduct an Rx by receiving a signal from the first UE 570 and may simultaneously conduct an Rx by receiving a signal from second UE 572 (i.e., simultaneous reception mode). In another example, the first IAB node 562 may conduct a Tx by transmitting a signal to the first UE 570 and may simultaneously conduct a Tx by transmitting a signal to the second UE 572 (e.g., simultaneous transmission mode). In another example, the first IAB node 562 may conduct a Tx by transmitting a signal to the first UE 570 and may simultaneously conduct an Rx by receiving a signal from the second UE 572. In another example, the first IAB node 562 may conduct an Rx by receiving a signal from the first UE 570 and may simultaneously conduct a Tx by transmitting a signal to the second UE 572. In case the first IAB node 562 conducts the Rx by receiving the signal from the first UE 570 and simultaneously conducts the Tx by transmitting the signal to the second UE 572, the first IAB node 562 may experience a self-interference from the Rx and the Tx, and the second UE 572 may experience a CLI from the uplink transmission by the first UE 570.

In another aspect, the second IAB node 564, e.g., the IAB DU of the second IAB node 564, may have at least two antenna panels: a first antenna panel configured to communicate with the third UE 574 and a second antenna panel configured to communicate with the fourth UE 576. Each of the antenna panels may operate independently of one another. The second IAB node 564 may be configured to conduct simultaneous communication with the third UE 574 and the fourth UE 576 (i.e., the communication transmissions have overlapping resources). In one example, the second IAB node 564 may conduct an Rx by receiving a signal from the third UE 574 and may simultaneously conduct an Rx by receiving a signal from fourth UE 576 (i.e., simultaneous reception mode). In another example, the second IAB node 564 may conduct a Tx by transmitting a signal to the third UE 574 and may simultaneously conduct a Tx by transmitting a signal to the fourth UE 576 (e.g., simultaneous transmission mode). In another example, the second IAB node 564 may conduct a Tx by transmitting a signal to the third UE 574 and may simultaneously conduct an Rx by receiving a signal from the fourth UE 576. In another example, the second IAB node 564 may conduct an Rx by receiving a signal from the third UE 574 and may simultaneously conduct a Tx by transmitting a signal to the fourth UE 576. In case the second IAB node 564 conducts the Rx by receiving the signal from the third UE 574 and simultaneously conducts the Tx by transmitting the signal to the fourth UE 576, the second IAB node 564 may experience a self-interference from the Rx and the Tx, and the fourth UE 576 may experience a CLI from the uplink transmission by the third UE 574.

Figure 6:
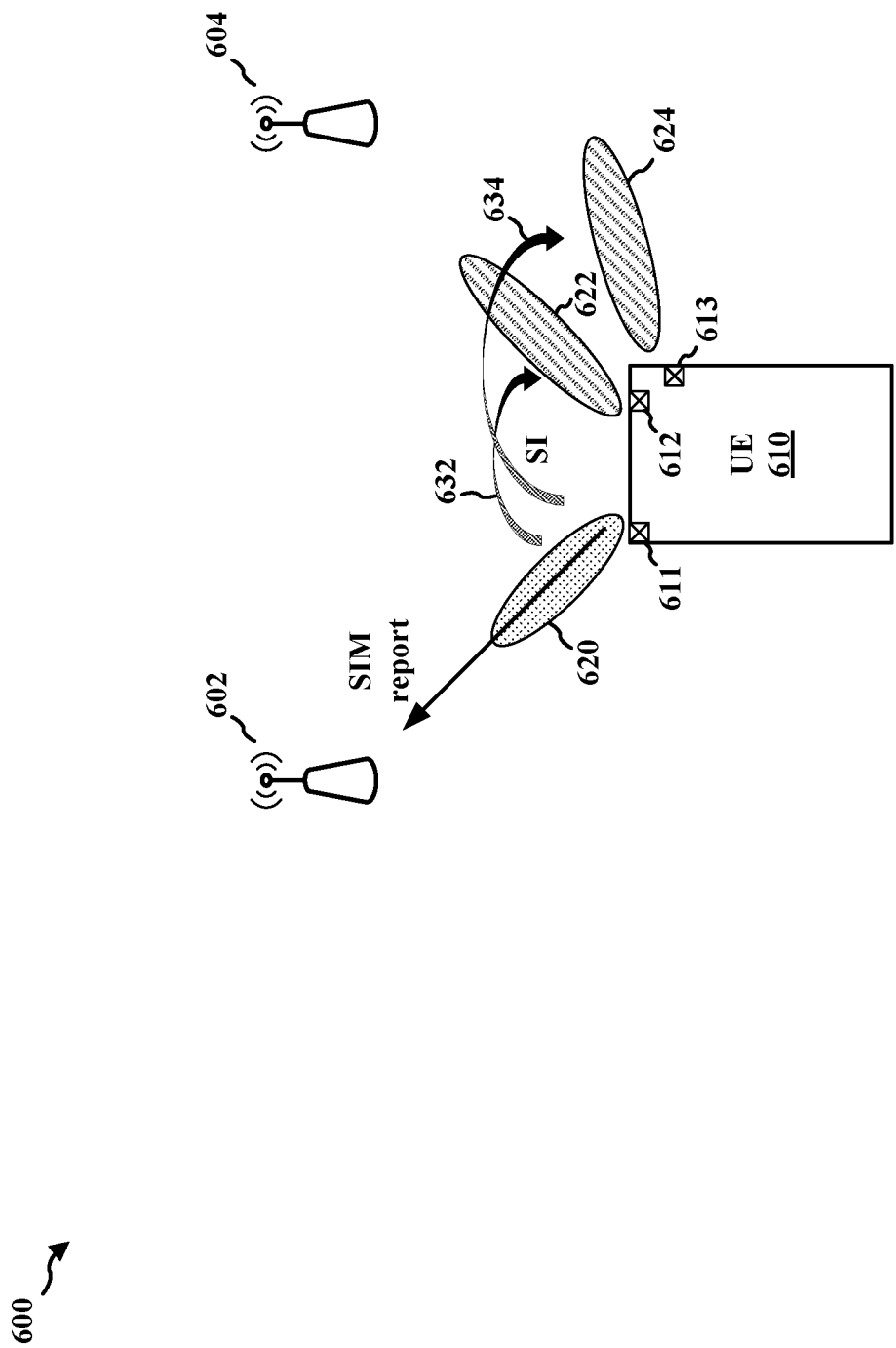
FIG. 6 is a FD configuration of self-interference measurement at the UE side.

FIG. 6 is a FD configuration 600 of self-interference measurement at the UE side. The FD configuration 600 including a first network node 602, a second network node 604, and a UE 610. For example, the UE 610 may be connected to the first network node 602 and a second network node 604 with the mTRP configuration. Here, the first network node 602 and the second network node 604 may be TRPs, and the UE 610 may be configured to communicate with the network (e.g., the base station) through multiple TRPs including the first network node 602 and the second network node 604.

The UE 610 may have at least two antenna panels: a first antenna panel configured to communicate with the first network node 602 and a second antenna panel configured to communicate with the second network node 604. The UE 610 may concurrently transmit an uplink signal to the first network node 602 while receiving a downlink signal from the second network node 604. The UE 610 may experience self-interference as a result of the first signal and the second signal being communicated simultaneously. For example, the uplink signal transmitted by the UE's transmitter may be leaked to (or be received by) the UE's receiver, and the UE 610 may experience self-interference at the receiving antenna receiving the downlink signal from the second network node 604, the self-interference caused by some of the uplink signal transmitted to the first network node 602.

Referring to FIG. 6, the UE 610 may have three antenna panels: a first antenna panel 611 configured to communicate with the first network node 602, and a second antenna panel 612 and a third antenna panel 613 configured to communicate with the second network node 604. For example, the UE 610 may be configured to transmit an uplink transmission (e.g., a PUSCH) to the first network node 602 using the first antenna panel 611, and configured to receive a downlink transmission (e.g., a PDSCH) from the second network node 604 using at least one of the second antenna panel 612 or the third antenna panel 613. In one example, the uplink transmission transmitted by the UE 610 may be transmitted to the first network node 602 via a Tx beam 620. In another example, the downlink transmission received by the UE 610 may be received from the second network node 604 via at least one of a first Rx beam 622 or a second Rx beam 624.

For the UE 610 operating in the FD mode, the uplink transmission to the first network node 602 may cause self-interference to the downlink transmission from the second network node 604. For example, the uplink transmission to the first network node 602 using the Tx beam 620 may cause the self-interference (e.g., a first self-interference 632 or a second self-interference 634) to downlink transmission from the second network node 604 using at least one of the first Rx beam 622 or the second Rx beam 624. In one example, the UE 610 may be configured to receive the downlink transmission via the first Rx beam 622 associated with the second antenna panel 612, and the uplink transmission to the first network node 602 may cause self-interference to the downlink transmission received at the second antenna panel 612 using the first Rx beam 622. In another example, the UE 610 may be configured to receive the downlink transmission via the second Rx beam 624 associated with the third antenna panel 613, and the uplink transmission to the first network node 602 may cause self-interference to the downlink transmission received at the third antenna panel 613 using the second Rx beam 624.

The UE 610 may be configured to obtain or generate a self-interference measurement report associated with an uplink transmission and transmit the generated self-interference measurement report to the network. The network may receive the self-interference measurement report from the UE, and control the scheduling of the uplink transmission via the first network node 602 and the downlink transmission via the second network node 604 to reduce or minimize the self-interference caused at the UE 610 operating in the FD mode and improve the network throughput of the downlink signal to the UE 610.

In some aspects, the network (e.g., a first network node 602) may configure the UE to obtain and transmit the self-interference measurement report caused by an uplink transmission using the scheduling information associated with the uplink transmission. The network may reduce or save the communication overhead by instructing the self-interference measurement report using the scheduling information associated with the uplink transmission. That is, instead of sending a separate or dedicated configuration/instruction to send a self-interference measurement report, the first network node 602 may include a timing information associated with the self-interference measurement report in the scheduling information of the uplink transmission, and the UE 610 may obtain and transmit the self-interference measurement report based on the scheduling information of the uplink transmission including the timing information associated with the self-interference measurement report.

For example, the first network node 602 may include at least a timing information in the scheduling information of the uplink transmission (e.g., one or more PUSCH occasions) to identify the uplink transmission (e.g., a particular PUSCH occasion) subject to the self-interference measuring. The UE may receive the scheduling information associated with the uplink transmission (e.g., one or more PUSCH occasions), identify at least one uplink transmission (e.g., a particular PUSCH occasion) subject to the self-interference measurement, measure the self-interference caused by the identified at least one uplink transmission using at least one antenna panel associated with a Rx beam, and report the self-interference measurement to the network.

In one aspect, the network may indicate a particular PUSCH or a particular slot for the self-interference measurement, which may be configured for an aperiodically scheduled PUSCH with or without repetition. That is, the scheduling information may be a dynamic grant of an aperiodic PUSCH occasions, and the timing information associated with the self-interference measurement may indicate the particular PUSCH among the aperiodic PUSCH occasions. The UE may obtain and report the self-interference report caused by the particular PUSCH indicated by the timing information included in the scheduling information.

In another aspect, the network may configure the UE to report multiple PUSCH occasions e.g. within a time window for self-interference measurement, which could be periodically scheduled PUSCH with or without repetition. That is, the scheduling information may be a configured grant of a semi-persistent or periodic PUSCH occasions, and the timing information associated with the self-interference measurement may indicate a time window for self-interference measurement. The UE may obtain and report the self-interference report caused by one or more PUSCH occasions within the time window indicated by the timing information associated with the self-interference measurement included in the scheduling information.

In another aspect, the scheduling information may or may not configure information of Rx quasi co-location (QCL) associated with the self-interference measurement. The Rx QCL information associated with the self-interference measurement may indicate the Rx beam to be used for the self-interference measurement, and therefore, the Rx QCL information may indicate the at least one antenna panel that the self-interference is measured.

In one option, the scheduling information may configure information of Rx QCL associated with the self-interference measurement. Based on the Rx QCL information associated with the self-interference measurement, the UE may obtain the self-interference measurement report and transmit the self-interference measurement report to the network node. That is, the UE may measure the self-interference caused by the uplink transmission (e.g., the particular PUSCH occasion) at the antenna panel associated with the Rx beam corresponding to the Rx QCL indicated by the scheduling information.

In another option, the scheduling information may not configure information of Rx QCL associated with the self-interference measurement. Based on the scheduling information not including the Rx QCL information associated with the self-interference measurement, the UE may determine at least one antenna panel to measure the self-interference, and obtain the self-interference measurement report based on the uplink transmission (e.g., the particular PUSCH occasion) indicated by the timing information of the scheduling information.

In one aspect, for each measured UL resource, the UE may add an indication or specify a Rx beam QCL info for self-interference measurement. That is, the UE may include an indication of the QCL information of the Rx beam used to measure the self-interference measurement. The UE may include, for each self-interference measurement of the PUSCH occasions, the QCL information of the Rx beam used to measure the corresponding self-interference measurement in the self-interference measurement report. For example, the indication of the QCL information of the Rx beam may include a dynamic grant (DG) downlink (DL) control information (DCI) or a radio resource control (RRC) DL beam configuration.

In some aspects, the scheduling information including the timing information of the self-interference measurement and UE self-interference measurement report may be based on a UE request. That is, the UE may transmit a request for the self-interference measurement, and the network may configure the scheduling information instructing the self-interference measurement based on the request for the self-interference measurement received from the UE.

In one aspect, the UE may request the uplink transmission to perform the self-interference measurement. For example, the UE may request the uplink transmissions for measuring the self-interference to be one of a periodic uplink transmission resources, an aperiodic uplink transmission resources, or a semi-persistent UL transmission resources (e.g., MAC-CE activated). Based on the request received from the UE, the network may schedule at least one of the periodic uplink transmission resources, the aperiodic uplink transmission resources, or the semi-persistent UL transmission resources and include a timing information to instruct the UE to measure the self-interference caused by the scheduled uplink occasion, and report the self-interference measurement to the network.

In another aspect, the UE may request self-interference measurement and report for an uplink beam/panel, a downlink beams/panels, or a pair of uplink and downlink beams/panels. That is, the UE may identify or indicate at least one of an uplink beam/panel or a downlink beam/panel, and the network may schedule the uplink transmission occasion subject to the self-interference measurement or indicate the Rx beam/antenna panel for measuring the self-interference caused by the scheduled uplink transmission occasion. In one example, the UE may indicate at least one recommended Tx beam/antenna panel for transmitting the uplink transmission (e.g., the PUSCH occasion) subject to the self-interference measurement or at least one Tx beam/antenna panel not recommended for transmitting the uplink transmission (e.g., the PUSCH occasion) subject to the self-interference measurement. In another example, the UE may indicate at least one recommended Rx beam/antenna panel for measuring the self-interference measurement caused by the uplink transmission (e.g., the PUSCH occasion) subject to the self-interference measurement or at least one Rx beam/antenna panel not recommended for measuring the self-interference measurement caused by the uplink transmission (e.g., the PUSCH occasion) subject to the self-interference measurement.

In another aspect, the at least one Tx or Rx beam/antenna panel or a pair of Tx and Rx beams/antenna panels recommended or not recommended for the self-interference measurement report may be determined through various ways.

In one example, the UE may select or identify the at least one Tx or Rx beam/antenna panel or a pair of Tx and Rx beams/antenna panels recommended or not recommended for the self-interference measurement report based on or derived from previous measurements of the beams/antenna panels. That is, based on the previous measurements of the Rx and Tx beams/antenna panels, the UE may have certain understanding of the Rx beams/antenna panels and the Tx beams/antenna panels with the respective network nodes, and the UE may indicate the network node of the at least one Tx or Rx beam/antenna panel or a pair of Tx and Rx beams/antenna panels that may be most likely or least likely to be used for the uplink and/or downlink transmissions. By indicating the at least one Tx or Rx beam/antenna panel or a pair of Tx and Rx beams/antenna panels recommended or not recommended for the self-interference measurement report based on or derived from previous measurements of the beams/antenna panels, the network and the UE may obtain the self-interference measurement report that may be most relevant to the actual data transmission environment.

In another example, the UE may select or identify the at least one Tx or Rx beam/antenna panel or a pair of Tx and Rx beams/antenna panels recommended or not recommended for the self-interference measurement report based on or derived from machine learning (ML) algorithms. That is, the UE may have the ML algorithm trained to estimate the at least one Tx or Rx beam/antenna panel or a pair of Tx and Rx beams/antenna panels that may be most likely or least likely to be used for the uplink and/or downlink transmissions based on various network conditions (e.g., previous measurements of the beams/antenna panels). Based on the output of the ML algorithm regarding the at least one Tx or Rx beam/antenna panel or a pair of Tx and Rx beams/antenna panels that may be most likely or least likely to be used for the uplink and/or downlink transmissions, the UE may indicate the at least one Tx or Rx beam/antenna panel or a pair of Tx and Rx beams/antenna panels recommended or not recommended for the self-interference measurement report, and the network and the UE may obtain the self-interference measurement report that may be most relevant to the actual data transmission environment.

In another aspect, the UE may request that the self-interference measurement is configured for a dedicated sub-band(s) or component carrier(s). That is, the uplink transmissions and the receive transmissions may be configured for certain sub-band(s) or certain component carrier(s), and the UE may request for the self-interference measurement and further indicate that the request be configured for the certain sub-band(s) or the certain component carrier(s) that may be relevant to the self-interference.

In some aspects, based on the UE's self-interference measurement reports or an ML algorithm outcome, the UE may be configured to send a recommendation of network configuration for future communication. That is, based on the outcome of the self-interference measurements, the UE may obtain an understanding of the network environment and the self-interferences caused by the FD operation. In one example, the UE may transmit a recommendation of certain information associated with the network configuration based on the outcome of the self-interference report. In another example, the UE may have an ML algorithm trained to estimate the recommended network configuration based on the outcome of the self-interference measurement report, and transmit the recommendation of certain information associated with the network configuration estimated by the ML algorithm.

In one example, the UE may provide an indication of recommended and/or restricted beams or beam pairs for the UE to operate in FD mode, and the network node may configure the UE with the beams or beam pairs to operate in the FD mode based on the recommended and/or restricted beams or beam pairs indicated by the UE. The indication of the recommended and/or restricted beam or beam pairs may be based on the self-interference measurement report obtained by the UE.

In another example, the UE may further indicate additional information associated with each of the recommended and/or restricted beams or beam pairs. For example, the UE may further indicate the following information associated with each of the recommended and/or restricted beams or beam pairs: a bandwidth part (BWP) identifier (ID) or a component carrier ID associated with each of the recommended and/or restricted beams or beam pairs; a timing scheme used for the self-interference measurements (e.g. the measurement timing aligned with the downlink timing or the uplink self-interference Rx timing); a number of slots or symbols prior to the current time that the self-interference was measured (e.g., indicating that the self-interference was measured M slots/symbols prior); or a time window for applying the recommended and/or restricted beams or beam pairs (e.g., indicating that the recommended and/or restricted beams or beam pairs may be applied for future N slots in a time window).

Figure 7:
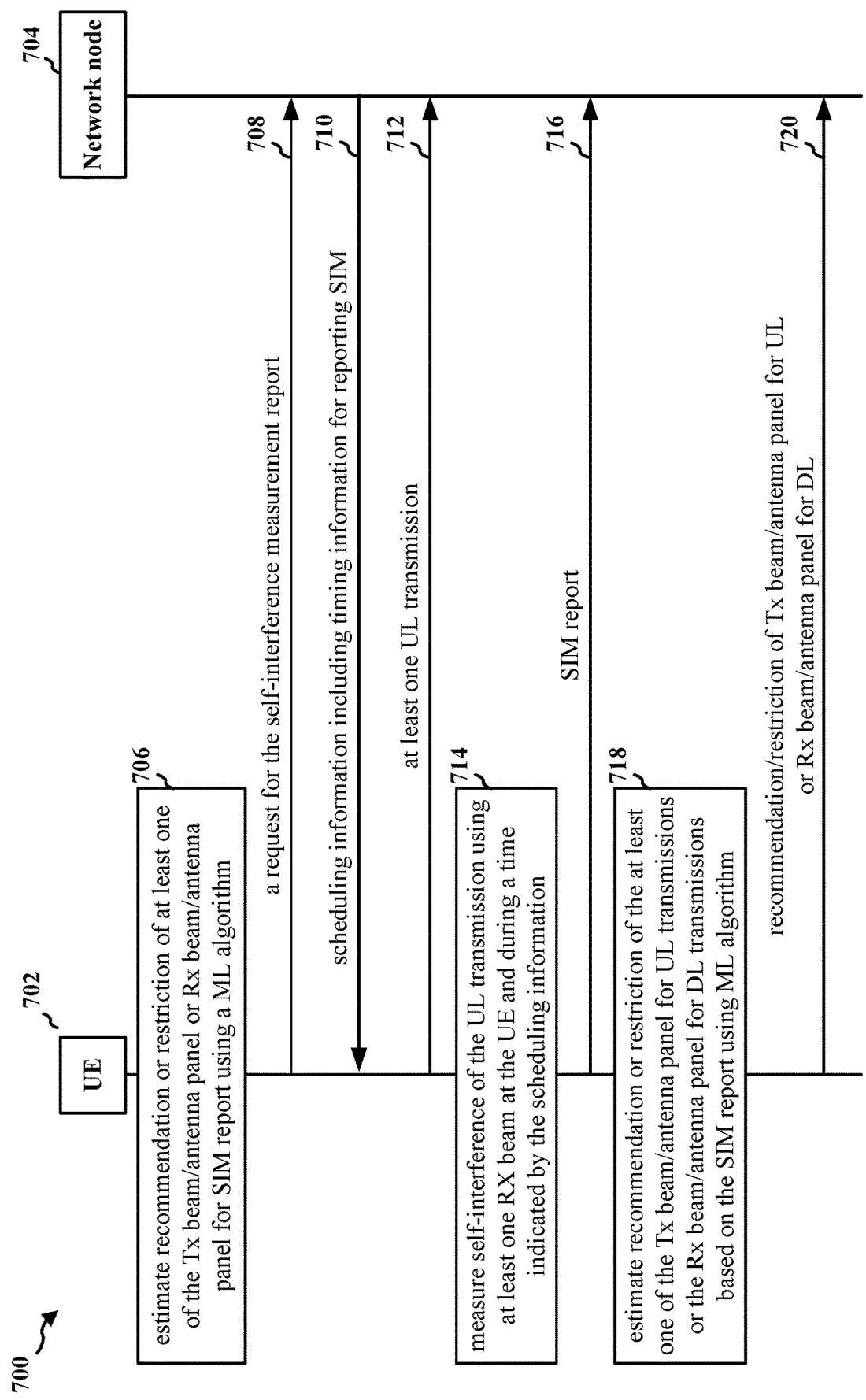
FIG. 7 is a call-flow diagram of a method of wireless communication.

FIG. 7 is a call-flow diagram 700 of a method of wireless communication. The call-flow diagram 700 may include a UE 702 and a network node 704. Here, the network node 704 may be a TRP, and the UE 702 may be connected to the network node 704 (e.g., the first network node 602) and another network node (e.g., the second network node 604) with the mTRP configuration. The UE 702 may receive, from the network node 704, a scheduling information including timing information for reporting a self-interference measurement, and transmit a self-interference measurement report including the self-interference measurement based on the scheduling information received from a network node 704. In one aspect, the timing information may instruct the UE 702 to obtain the self-interference measurement report. The UE 702 may transmit a request for the self-interference measurement report, and the self-interference measurement may be triggered or initiated based on the request transmitted by the UE 702. The UE 702 may also transmit a recommendation or restriction of at least one of a Tx beam/antenna panel for UL transmissions or Rx beam/antenna panel for DL transmissions based on the self-interference measurement reports. The network node 704 may receive the self-interference measurement report from the UE 702 and control the scheduling of the uplink transmission via the network node 704 to reduce or minimize the self-interference caused at the UE 702 and improve the network throughput of the downlink signal to the UE 702.

At 706, the UE 702 may estimate the recommendation or the restriction of the at least one of the Tx beam/antenna panel or the Rx beam/antenna panel using a ML algorithm. That is, the UE 702 may have the ML algorithm trained to estimate the at least one Tx or Rx beam/antenna panel or a pair of Tx and Rx beams/antenna panels that may be most likely or least likely to be used for the uplink and/or downlink transmissions based on various network conditions (e.g., previous measurements of the beams/antenna panels). Based on the output of the ML algorithm regarding the at least one Tx or Rx beam/antenna panel or a pair of Tx and Rx beams/antenna panels that may be most likely or least likely to be used for the uplink and/or downlink transmissions, the UE 702 may indicate the at least one Tx or Rx beam/antenna panel or a pair of Tx and Rx beams/antenna panels recommended or not recommended for the self-interference measurement report, and the network node 704 and the UE 702 may obtain the self-interference measurement report that may be most relevant to the actual data transmission environment.

At 708, the UE 702 may transmit a request for the self-interference measurement report to the network node 704 prior to receiving the scheduling information. The network node 704 may receive a request for the self-interference measurement report prior to transmitting the scheduling information. That is, the UE 702 may transmit a request for the self-interference measurement, and the network node 704 may configure the scheduling information instructing the self-interference measurement based on the request for the self-interference measurement received from the UE 702. For example, the UE 702 may request the uplink transmissions for measuring the self-interference to be one of a periodic uplink transmission resources, an aperiodic uplink transmission resources, or a semi-persistent UL transmission resources (e.g., MAC-CE activated).

In one aspect, the request for the self-interference measurement report may request one or more of periodic resources for the self-interference measurement, aperiodic resources for the self-interference measurement, a semi-persistent resources for the self-interference measurement, a first measurement of a first beam or a first panel that is dedicated for uplink, a second measurement of a second beam or a second panel that is dedicated for downlink, or a third measurement of a third beam or a third panel that is for the uplink and the downlink. That is, the UE 702 may identify or indicate at least one of an uplink beam/panel or a downlink beam/panel, and the network node 704 may schedule the uplink transmission occasion subject to the self-interference measurement or indicate the Rx beam/antenna panel for measuring the self-interference caused by the scheduled uplink transmission occasion. In one example, the UE 702 may indicate at least one recommended Tx beam/antenna panel for transmitting the uplink transmission (e.g., the PUSCH occasion) subject to the self-interference measurement or at least one Tx beam/antenna panel not recommended for transmitting the uplink transmission (e.g., the PUSCH occasion) subject to the self-interference measurement. In another example, the UE 702 may indicate at least one recommended Rx beam/antenna panel for measuring the self-interference measurement caused by the uplink transmission (e.g., the PUSCH occasion) subject to the self-interference measurement or at least one Rx beam/antenna panel not recommended for measuring the self-interference measurement caused by the uplink transmission (e.g., the PUSCH occasion) subject to the self-interference measurement.

In another aspect, the request for the self-interference measurement report may indicate at least one sub-band or component carrier. That is, the uplink transmissions and the receive transmissions may be configured for certain sub-band(s) or certain component carrier(s), and the UE 702 may request for the self-interference measurement and further indicate that the request be configured for the certain sub-band(s) or the certain component carrier(s) that may be relevant to the self-interference.

In another aspect, the request for the self-interference measurement report may include a recommendation or a restriction of at least one of a Tx beam/antenna panel to transmit at least one uplink transmission, or a Rx beam/antenna panel to obtain the self-interference measurement.

In one example, the recommendation or the restriction of the at least one of the Tx beam/antenna panel or the Rx beam/antenna panel may be based on previous measurements of a plurality of Tx beams/antenna panels including the Tx beam/antenna panel or a plurality of Rx beams/antenna panels including the Rx beam/antenna panel. That is, based on the previous measurements of the Rx and Tx beams/antenna panels, the UE 702 may have certain understanding of the Rx beams/antenna panels and the Tx beams/antenna panels with the respective network nodes, and the UE 702 may indicate the network node 704 of the at least one Tx or Rx beam/antenna panel or a pair of Tx and Rx beams/antenna panels that may be most likely or least likely to be used for the uplink and/or downlink transmissions. By indicating the at least one Tx or Rx beam/antenna panel or a pair of Tx and Rx beams/antenna panels recommended or not recommended for the self-interference measurement report based on or derived from previous measurements of the beams/antenna panels, the network node 704 and the UE 702 may obtain the self-interference measurement report that may be most relevant to the actual data transmission environment.

In another example, the recommendation or the restriction of at least one of the Tx beam/antenna panel to transmit the at least one uplink transmission or the Rx beam/antenna panel to obtain the self-interference measurement may be estimated using the ML algorithm at 706.

At 710, the network node 704 may transmit scheduling information for a UE 702, scheduling information including timing information for reporting a self-interference measurement. The UE 702 may receive scheduling information including timing information for reporting a self-interference measurement. Here, the scheduling information may be received based on the request for the self-interference measurement report transmitted to the network node 704 at 708. For example, the network node 704 may include at least a timing information in the scheduling information of the uplink transmission (e.g., one or more PUSCH occasions) to identify the uplink transmission (e.g., a particular PUSCH occasion) subject to the self-interference measuring. Based on the request received from the UE 702 at 708, the network node 704 may schedule at least one of the periodic uplink transmission resources, the aperiodic uplink transmission resources, or the semi-persistent UL transmission resources and include a timing information to instruct the UE 702 to measure the self-interference caused by the scheduled uplink occasion, and report the self-interference measurement to the network node 704.

In one aspect, the scheduling information may indicate for the UE 702 to provide the self-interference measurement for one or more of a PUSCH occasion, a dynamic grant scheduling an aperiodic PUSCH, the PUSCH occasion with repetition, the PUSCH occasion without repetition, a slot, or multiple PUSCH occasions within a time window. The network node 704 may indicate a particular PUSCH or a particular slot for the self-interference measurement, which may be configured for an aperiodically scheduled PUSCH with or without repetition. That is, the scheduling information may be a dynamic grant of an aperiodic PUSCH occasions, and the timing information associated with the self-interference measurement may indicate the particular PUSCH among the aperiodic PUSCH occasions. The UE 702 may obtain and report the self-interference report caused by the particular PUSCH indicated by the timing information included in the scheduling information.

In another aspect, the scheduling information may indicate for the UE 702 to provide the self-interference measurement for the multiple PUSCH occasions based on a configured grant scheduling periodic PUSCH, and the indication identifies the time window for measuring the self-interference. The network node 704 may configure the UE 702 to report multiple PUSCH occasions e.g. within a time window for self-interference measurement, which could be periodically scheduled PUSCH with or without repetition. That is, the scheduling information may be a configured grant of a semi-persistent or periodic PUSCH occasions, and the timing information associated with the self-interference measurement may indicate a time window for self-interference measurement. The UE 702 may obtain and report the self-interference report caused by one or more PUSCH occasions within the time window indicated by the timing information associated with the self-interference measurement included in the scheduling information.

In another aspect, the scheduling information may include RX QCL information for the self-interference measurement, and the RX beam may be associated with the Rx QCL information. Here, the Rx QCL information may be associated with at least one of a DG DCI or an RRC DL beam configuration. The scheduling information may or may not configure information of Rx QCL associated with the self-interference measurement. The Rx QCL information associated with the self-interference measurement may indicate the Rx beam to be used for the self-interference measurement, and therefore, the Rx QCL information may indicate the at least one antenna panel that the self-interference is measured.

In one option, the scheduling information may configure information of Rx QCL associated with the self-interference measurement. Based on the Rx QCL information associated with the self-interference measurement, the UE 702 may obtain the self-interference measurement report and transmit the self-interference measurement report to the network node 704. That is, the UE 702 may measure the self-interference caused by the uplink transmission (e.g., the particular PUSCH occasion) at the antenna panel associated with the Rx beam corresponding to the Rx QCL indicated by the scheduling information.

In another option, the scheduling information may not configure information of Rx QCL associated with the self-interference measurement. Based on the scheduling information not including the Rx QCL information associated with the self-interference measurement, the UE 702 may determine at least one antenna panel to measure the self-interference, and obtain the self-interference measurement report based on the uplink transmission (e.g., the particular PUSCH occasion) indicated by the timing information of the scheduling information.

At 712, the UE 702 may transmit at least one uplink transmission. The network node 704 may receive at least one uplink transmission. The UE 702 may have at least two antenna panels: a first antenna panel configured to communicate with the network node 704 and a second antenna panel configured to communicate with the another network node. The UE 702 may concurrently transmit an uplink signal to the network node 704 while receiving a downlink signal from the another network node. The UE 702 may experience self-interference as a result of the first signal and the second signal being communicated simultaneously. For example, the uplink signal transmitted by the UE's transmitter may be leaked to (or be received by) the UE's receiver, and the UE 702 may experience self-interference at the receiving antenna receiving the downlink signal from the another network node, the self-interference caused by some of the uplink signal transmitted to the first base station.

At 714, the UE 702 may measure self-interference of the uplink transmission using at least one Rx beam at the UE 702 and during a time indicated by the scheduling information. Here, the UE 702 may be configured to measure the self-interference caused by the at least one uplink transmission transmitted at 712, based on the time information indicated by the scheduling information received at 710.

In one aspect, the scheduling information may be a dynamic grant of an aperiodic PUSCH occasions, and the UE 702 may measure the self-interference caused by the particular PUSCH among the aperiodic PUSCH occasions indicated by the time information of the scheduling information received at 710. In another aspect, the scheduling information may be a configured grant of a semi-persistent or periodic PUSCH occasions, and the UE 702 may measure the self-interference caused by the one or more PUSCH occasions within the time window indicated by the timing information included in the scheduling information.

In some aspects, the scheduling information may or may not configure the Rx QCL information associated with the self-interference measurement. In one aspect, the scheduling information received at 710 may include the Rx QCL information associated with the self-interference measurement, and the UE 702 may obtain the self-interference measurement at the antenna panel associated with the Rx beam corresponding to the Rx QCL information received at 710. That is, the UE 702 may measure the self-interference caused by the uplink transmission (e.g., the particular PUSCH occasion) at the antenna panel associated with the Rx beam corresponding to the Rx QCL indicated by the scheduling information.

In another aspect, the scheduling information received at 710 may not include the Rx QCL information associated with the self-interference measurement. Based on the scheduling information not including the Rx QCL information associated with the self-interference measurement, the UE 702 may determine at least one antenna panel to measure the self-interference, and obtain the self-interference measurement report based on the uplink transmission (e.g., the particular PUSCH occasion) indicated by the timing information of the scheduling information.

At 716, the UE 702 may transmit a self-interference measurement report including the self-interference measurement based on the scheduling information received from a network node 704 at 710. The network node 704 may receive a self-interference measurement report including the self-interference measurement based on the scheduling information received from the network node 704 at 710.

In case the scheduling information received at 710 may not configure information of Rx QCL associated with the self-interference measurement, for each measured UL resource, the UE 702 may add an indication or specify a Rx beam QCL info for self-interference measurement. That is, the UE 702 may include an indication of the QCL information of the Rx beam used to measure the self-interference measurement. The UE 702 may include, for each self-interference measurement of the PUSCH occasions, the QCL information of the Rx beam used to measure the corresponding self-interference measurement in the self-interference measurement report. For example, the indication of the QCL information of the Rx beam may include a DG DCI or an DL beam configuration.

At 718, the UE 702 may estimate the recommendation or the restriction of the at least one of the Tx beam/antenna panel for the uplink transmissions or the Rx beam/antenna panel for the downlink transmissions based on the self-interference measurement report using a ML algorithm. That is, the UE 702 may have an ML algorithm trained to estimate the recommended network configuration based on the outcome of the self-interference measurement report, and transmit the recommendation of certain information associated with the network configuration estimated by the ML algorithm at 720.

At 720, the UE 702 may transmit a recommendation or a restriction of at least one of a Tx beam/antenna panel for uplink transmissions or a Rx beam/antenna panel for downlink transmissions based on the self-interference measurement report. The network node 704 may receive a recommendation or a restriction of at least one of a Tx beam/antenna panel for uplink transmissions or a Rx beam/antenna panel for downlink transmissions based on the self-interference measurement report.

The recommendation or the restriction of the at least one of the Tx beam/antenna panel or the Rx beam/antenna panel may further include at least one information associated with the at least one of the Tx beam/antenna panel or the Rx beam/antenna panel, the at least one information includes at least one of BWP ID, CC ID, used measurement timing scheme, at least one self-interference previously measured at one or more symbols prior, or a time window for applying the recommendation or the restriction at one or more symbols later. That is, based on the outcome of the self-interference measurements, the UE 702 may obtain an understanding of the network environment and the self-interferences caused by the FD operation. In one example, the UE 702 may transmit a recommendation of certain information associated with the network configuration based on the outcome of the self-interference report. In another example, the UE 702 may have an ML algorithm trained to estimate the recommended network configuration based on the outcome of the self-interference measurement report, and transmit the recommendation of certain information associated with the network configuration estimated by the ML algorithm at 718.

In one example, the UE 702 may provide an indication of recommended and/or restricted beams or beam pairs for the UE 702 to operate in FD mode, and the network node 704 may configure the UE 702 with the beams or beam pairs to operate in the FD mode based on the recommended and/or restricted beams or beam pairs indicated by the UE 702. The indication of the recommended and/or restricted beam or beam pairs may be based on the self-interference measurement report obtained by the UE 702.

In another example, the UE 702 may further indicate additional information associated with each of the recommended and/or restricted beams or beam pairs. For example, the UE 702 may further indicate the following information associated with each of the recommended and/or restricted beams or beam pairs: a bandwidth part (BWP) identifier (ID) or a component carrier ID associated with each of the recommended and/or restricted beams or beam pairs; a timing scheme used for the self-interference measurements (e.g. the measurement timing aligned with the downlink timing or the uplink self-interference Rx timing); a number of slots or symbols prior to the current time that the self-interference was measured (e.g., indicating that the self-interference was measured M slots/symbols prior); or a time window for applying the recommended and/or restricted beams or beam pairs (e.g., indicating that the recommended and/or restricted beams or beam pairs may be applied for future N slots in a time window).

Figure 8:
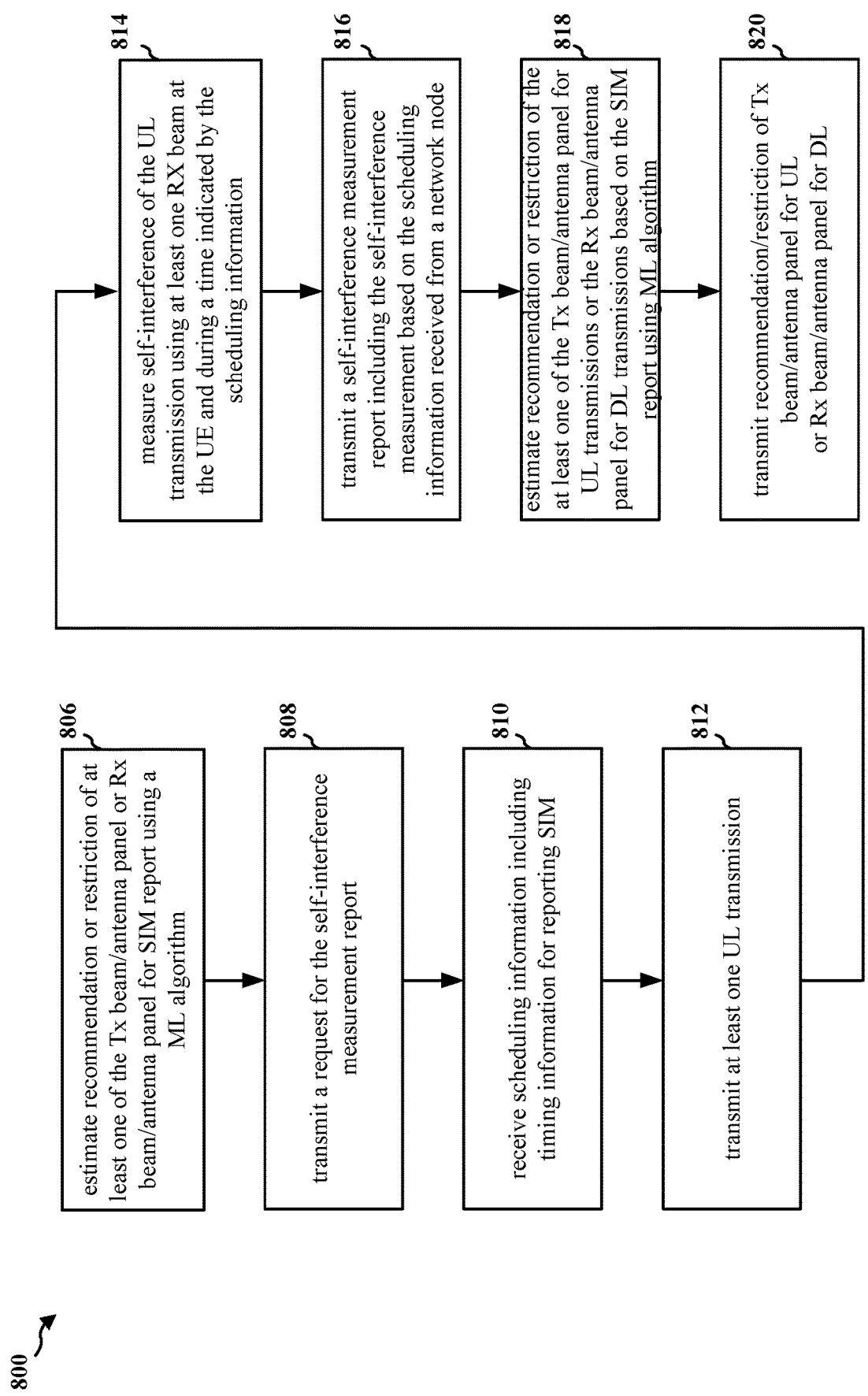
FIG. 8 is a flowchart of a method of wireless communication.

FIG. 8 is a flowchart 800 of a method of wireless communication. The method may be performed by a UE (e.g., the UE 104/610/702; the apparatus 1204). The UE may be connected to a network node (e.g., the first network node 602) and another network node (e.g., the second network node 604) with the mTRP configuration. The UE may receive, from the network node, a scheduling information including timing information for reporting a self-interference measurement, and transmit a self-interference measurement report including the self-interference measurement based on the scheduling information received from a network node. In one aspect, the timing information may instruct the UE to obtain the self-interference measurement report. The UE may transmit a request for the self-interference measurement report, and the self-interference measurement may be triggered or initiated based on the request transmitted by the UE. The UE may also transmit a recommendation or restriction of at least one of a Tx beam/antenna panel for UL transmissions or Rx beam/antenna panel for DL transmissions based on the self-interference measurement reports.

At 806, the UE may estimate the recommendation or the restriction of the at least one of the Tx beam/antenna panel or the Rx beam/antenna panel using a ML algorithm. That is, the UE may have the ML algorithm trained to estimate the at least one Tx or Rx beam/antenna panel or a pair of Tx and Rx beams/antenna panels that may be most likely or least likely to be used for the uplink and/or downlink transmissions based on various network conditions (e.g., previous measurements of the beams/antenna panels). Based on the output of the ML algorithm regarding the at least one Tx or Rx beam/antenna panel or a pair of Tx and Rx beams/antenna panels that may be most likely or least likely to be used for the uplink and/or downlink transmissions, the UE may indicate the at least one Tx or Rx beam/antenna panel or a pair of Tx and Rx beams/antenna panels recommended or not recommended for the self-interference measurement report, and the network node and the UE may obtain the self-interference measurement report that may be most relevant to the actual data transmission environment. For example, at 706, the UE 702 may estimate the recommendation or the restriction of the at least one of the Tx beam/antenna panel or the Rx beam/antenna panel using a ML algorithm. Furthermore, 806 may be performed by a self-interference measurement reporting component 198.

At 808, the UE may transmit a request for the self-interference measurement report to the network node prior to receiving the scheduling information. That is, the UE may transmit a request for the self-interference measurement, and the network node may configure the scheduling information instructing the self-interference measurement based on the request for the self-interference measurement received from the UE. For example, the UE may request the uplink transmissions for measuring the self-interference to be one of a periodic uplink transmission resources, an aperiodic uplink transmission resources, or a semi-persistent UL transmission resources (e.g., MAC-CE activated). For example, at 708, the UE 702 may transmit a request for the self-interference measurement report to the network node 704 prior to receiving the scheduling information. Furthermore, 808 may be performed by the self-interference measurement reporting component 198.

In one aspect, the request for the self-interference measurement report may request one or more of periodic resources for the self-interference measurement, aperiodic resources for the self-interference measurement, a semi-persistent resources for the self-interference measurement, a first measurement of a first beam or a first panel that is dedicated for uplink, a second measurement of a second beam or a second panel that is dedicated for downlink, or a third measurement of a third beam or a third panel that is for the uplink and the downlink. That is, the UE may identify or indicate at least one of an uplink beam/panel or a downlink beam/panel, and the network node may schedule the uplink transmission occasion subject to the self-interference measurement or indicate the Rx beam/antenna panel for measuring the self-interference caused by the scheduled uplink transmission occasion. In one example, the UE may indicate at least one recommended Tx beam/antenna panel for transmitting the uplink transmission (e.g., the PUSCH occasion) subject to the self-interference measurement or at least one Tx beam/antenna panel not recommended for transmitting the uplink transmission (e.g., the PUSCH occasion) subject to the self-interference measurement. In another example, the UE may indicate at least one recommended Rx beam/antenna panel for measuring the self-interference measurement caused by the uplink transmission (e.g., the PUSCH occasion) subject to the self-interference measurement or at least one Rx beam/antenna panel not recommended for measuring the self-interference measurement caused by the uplink transmission (e.g., the PUSCH occasion) subject to the self-interference measurement.

In another aspect, the request for the self-interference measurement report may indicate at least one sub-band or component carrier. That is, the uplink transmissions and the receive transmissions may be configured for certain sub-band(s) or certain component carrier(s), and the UE may request for the self-interference measurement and further indicate that the request be configured for the certain sub-band(s) or the certain component carrier(s) that may be relevant to the self-interference.

In another aspect, the request for the self-interference measurement report may include a recommendation or a restriction of at least one of a Tx beam/antenna panel to transmit at least one uplink transmission, or a Rx beam/antenna panel to obtain the self-interference measurement.

In one example, the recommendation or the restriction of the at least one of the Tx beam/antenna panel or the Rx beam/antenna panel may be based on previous measurements of a plurality of Tx beams/antenna panels including the Tx beam/antenna panel or a plurality of Rx beams/antenna panels including the Rx beam/antenna panel. That is, based on the previous measurements of the Rx and Tx beams/antenna panels, the UE may have certain understanding of the Rx beams/antenna panels and the Tx beams/antenna panels with the respective network nodes, and the UE may indicate the network node of the at least one Tx or Rx beam/antenna panel or a pair of Tx and Rx beams/antenna panels that may be most likely or least likely to be used for the uplink and/or downlink transmissions. By indicating the at least one Tx or Rx beam/antenna panel or a pair of Tx and Rx beams/antenna panels recommended or not recommended for the self-interference measurement report based on or derived from previous measurements of the beams/antenna panels, the network node and the UE may obtain the self-interference measurement report that may be most relevant to the actual data transmission environment.

In another example, the recommendation or the restriction of at least one of the Tx beam/antenna panel to transmit the at least one uplink transmission or the Rx beam/antenna panel to obtain the self-interference measurement may be estimated using the ML algorithm at 806.

At 810, the UE may receive scheduling information including timing information for reporting a self-interference measurement. Here, the scheduling information may be received based on the request for the self-interference measurement report transmitted to the network node at 808. For example, the network node may include at least a timing information in the scheduling information of the uplink transmission (e.g., one or more PUSCH occasions) to identify the uplink transmission (e.g., a particular PUSCH occasion) subject to the self-interference measuring. Based on the request received from the UE at 808, the network node may schedule at least one of the periodic uplink transmission resources, the aperiodic uplink transmission resources, or the semi-persistent UL transmission resources and include a timing information to instruct the UE to measure the self-interference caused by the scheduled uplink occasion, and report the self-interference measurement to the network node. For example, at 710, the UE 702 may receive scheduling information including timing information for reporting a self-interference measurement. Furthermore, 810 may be performed by the self-interference measurement reporting component 198.

In one aspect, the scheduling information may indicate for the UE to provide the self-interference measurement for one or more of a PUSCH occasion, a dynamic grant scheduling an aperiodic PUSCH, the PUSCH occasion with repetition, the PUSCH occasion without repetition, a slot, or multiple PUSCH occasions within a time window. The network node may indicate a particular PUSCH or a particular slot for the self-interference measurement, which may be configured for an aperiodically scheduled PUSCH with or without repetition. That is, the scheduling information may be a dynamic grant of an aperiodic PUSCH occasions, and the timing information associated with the self-interference measurement may indicate the particular PUSCH among the aperiodic PUSCH occasions. The UE may obtain and report the self-interference report caused by the particular PUSCH indicated by the timing information included in the scheduling information.

In another aspect, the scheduling information may indicate for the UE to provide the self-interference measurement for the multiple PUSCH occasions based on a configured grant scheduling periodic PUSCH, and the indication identifies the time window for measuring the self-interference. The network node may configure the UE to report multiple PUSCH occasions e.g. within a time window for self-interference measurement, which could be periodically scheduled PUSCH with or without repetition. That is, the scheduling information may be a configured grant of a semi-persistent or periodic PUSCH occasions, and the timing information associated with the self-interference measurement may indicate a time window for self-interference measurement. The UE may obtain and report the self-interference report caused by one or more PUSCH occasions within the time window indicated by the timing information associated with the self-interference measurement included in the scheduling information.

In another aspect, the scheduling information may include RX QCL information for the self-interference measurement, and the RX beam may be associated with the Rx QCL information. Here, the Rx QCL information may be associated with at least one of a DG DCI or an RRC DL beam configuration. The scheduling information may or may not configure information of Rx QCL associated with the self-interference measurement. The Rx QCL information associated with the self-interference measurement may indicate the Rx beam to be used for the self-interference measurement, and therefore, the Rx QCL information may indicate the at least one antenna panel that the self-interference is measured.

In one option, the scheduling information may configure information of Rx QCL associated with the self-interference measurement. Based on the Rx QCL information associated with the self-interference measurement, the UE may obtain the self-interference measurement report and transmit the self-interference measurement report to the network node. That is, the UE may measure the self-interference caused by the uplink transmission (e.g., the particular PUSCH occasion) at the antenna panel associated with the Rx beam corresponding to the Rx QCL indicated by the scheduling information.

In another option, the scheduling information may not configure information of Rx QCL associated with the self-interference measurement. Based on the scheduling information not including the Rx QCL information associated with the self-interference measurement, the UE may determine at least one antenna panel to measure the self-interference, and obtain the self-interference measurement report based on the uplink transmission (e.g., the particular PUSCH occasion) indicated by the timing information of the scheduling information.

At 812, the UE may transmit at least one uplink transmission at the UE. The UE may have at least two antenna panels: a first antenna panel configured to communicate with the network node and a second antenna panel configured to communicate with the another network node. The first UE may concurrently transmit an uplink signal to the network node while receiving a downlink signal from the another network node. The UE may experience self-interference as a result of the first signal and the second signal being communicated simultaneously. For example, the uplink signal transmitted by the UE's transmitter may be leaked to (or be received by) the UE's receiver, and the UE may experience self-interference at the receiving antenna receiving the downlink signal from the another network node, the self-interference caused by some of the uplink signal transmitted to the first base station. For example, at 712, the UE 702 may transmit at least one uplink transmission. Furthermore, 812 may be performed by the self-interference measurement reporting component 198.

At 814, the UE may measure self-interference of the uplink transmission using at least one Rx beam at the UE and during a time indicated by the scheduling information. Here, the UE may be configured to measure the self-interference caused by the at least one uplink transmission transmitted at 812, based on the time information indicated by the scheduling information received at 810. For example, at 714, the UE 702 may measure self-interference of the uplink transmission using at least one Rx beam at the UE 702 and during a time indicated by the scheduling information. Furthermore, 814 may be performed by the self-interference measurement reporting component 198.

In one aspect, the scheduling information may be a dynamic grant of an aperiodic PUSCH occasions, and the UE may measure the self-interference caused by the particular PUSCH among the aperiodic PUSCH occasions indicated by the time information of the scheduling information received at 810. In another aspect, the scheduling information may be a configured grant of a semi-persistent or periodic PUSCH occasions, and the UE may measure the self-interference caused by the one or more PUSCH occasions within the time window indicated by the timing information included in the scheduling information.

In some aspects, the scheduling information may or may not configure the Rx QCL information associated with the self-interference measurement. In one aspect, the scheduling information received at 810 may include the Rx QCL information associated with the self-interference measurement, and the UE may obtain the self-interference measurement at the antenna panel associated with the Rx beam corresponding to the Rx QCL information received at 810. That is, the UE may measure the self-interference caused by the uplink transmission (e.g., the particular PUSCH occasion) at the antenna panel associated with the Rx beam corresponding to the Rx QCL indicated by the scheduling information.

In another aspect, the scheduling information received at 810 may not include the Rx QCL information associated with the self-interference measurement. Based on the scheduling information not including the Rx QCL information associated with the self-interference measurement, the UE may determine at least one antenna panel to measure the self-interference, and obtain the self-interference measurement report based on the uplink transmission (e.g., the particular PUSCH occasion) indicated by the timing information of the scheduling information.

At 816, the UE may transmit a self-interference measurement report including the self-interference measurement based on the scheduling information received from a network node at 810. The network node may receive a self-interference measurement report including the self-interference measurement based on the scheduling information received from the network node at 810. In case the scheduling information received at 810 may not configure information of Rx QCL associated with the self-interference measurement, for each measured UL resource, the UE may add an indication or specify a Rx beam QCL info for self-interference measurement. That is, the UE may include an indication of the QCL information of the Rx beam used to measure the self-interference measurement. The UE may include, for each self-interference measurement of the PUSCH occasions, the QCL information of the Rx beam used to measure the corresponding self-interference measurement in the self-interference measurement report. For example, the indication of the QCL information of the Rx beam may include a DG DCI or an DL beam configuration. For example, at 716, the UE 702 may transmit a self-interference measurement report including the self-interference measurement based on the scheduling information received from a network node 704 at 710. Furthermore, 816 may be performed by a self-interference measurement reporting component 198.

At 818, the UE may estimate the recommendation or the restriction of the at least one of the Tx beam/antenna panel for the uplink transmissions or the Rx beam/antenna panel for the downlink transmissions based on the self-interference measurement report using a ML algorithm. That is, the UE may have an ML algorithm trained to estimate the recommended network configuration based on the outcome of the self-interference measurement report, and transmit the recommendation of certain information associated with the network configuration estimated by the ML algorithm at 820. For example, at 718, the UE may estimate the recommendation or the restriction of the at least one of the Tx beam/antenna panel for the uplink transmissions or the Rx beam/antenna panel for the downlink transmissions based on the self-interference measurement report using a ML algorithm. Furthermore, 818 may be performed by the self-interference measurement reporting component 198.

At 820, the UE may transmit a recommendation or a restriction of at least one of a Tx beam/antenna panel for uplink transmissions or a Rx beam/antenna panel for downlink transmissions based on the self-interference measurement report. The network node may receive a recommendation or a restriction of at least one of a Tx beam/antenna panel for uplink transmissions or a Rx beam/antenna panel for downlink transmissions based on the self-interference measurement report. For example, at 720, the UE 702 may transmit a recommendation or a restriction of at least one of a Tx beam/antenna panel for uplink transmissions or a Rx beam/antenna panel for downlink transmissions based on the self-interference measurement report. Furthermore, 820 may be performed by the self-interference measurement reporting component 198.

The recommendation or the restriction of the at least one of the Tx beam/antenna panel or the Rx beam/antenna panel may further include at least one information associated with the at least one of the Tx beam/antenna panel or the Rx beam/antenna panel, the at least one information includes at least one of BWP ID, CC ID, used measurement timing scheme, at least one self-interference previously measured at one or more symbols prior, or a time window for applying the recommendation or the restriction at one or more symbols later. That is, based on the outcome of the self-interference measurements, the UE may obtain an understanding of the network environment and the self-interferences caused by the FD operation. In one example, the UE may transmit a recommendation of certain information associated with the network configuration based on the outcome of the self-interference report. In another example, the UE may have an ML algorithm trained to estimate the recommended network configuration based on the outcome of the self-interference measurement report, and transmit the recommendation of certain information associated with the network configuration estimated by the ML algorithm at 818.

In one example, the UE may provide an indication of recommended and/or restricted beams or beam pairs for the UE to operate in FD mode, and the network node may configure the UE with the beams or beam pairs to operate in the FD mode based on the recommended and/or restricted beams or beam pairs indicated by the UE. The indication of the recommended and/or restricted beam or beam pairs may be based on the self-interference measurement report obtained by the UE.

In another example, the UE may further indicate additional information associated with each of the recommended and/or restricted beams or beam pairs. For example, the UE may further indicate the following information associated with each of the recommended and/or restricted beams or beam pairs: a bandwidth part (BWP) identifier (ID) or a component carrier ID associated with each of the recommended and/or restricted beams or beam pairs; a timing scheme used for the self-interference measurements (e.g. the measurement timing aligned with the downlink timing or the uplink self-interference Rx timing); a number of slots or symbols prior to the current time that the self-interference was measured (e.g., indicating that the self-interference was measured M slots/symbols prior); or a time window for applying the recommended and/or restricted beams or beam pairs (e.g., indicating that the recommended and/or restricted beams or beam pairs may be applied for future N slots in a time window).

Figure 9:
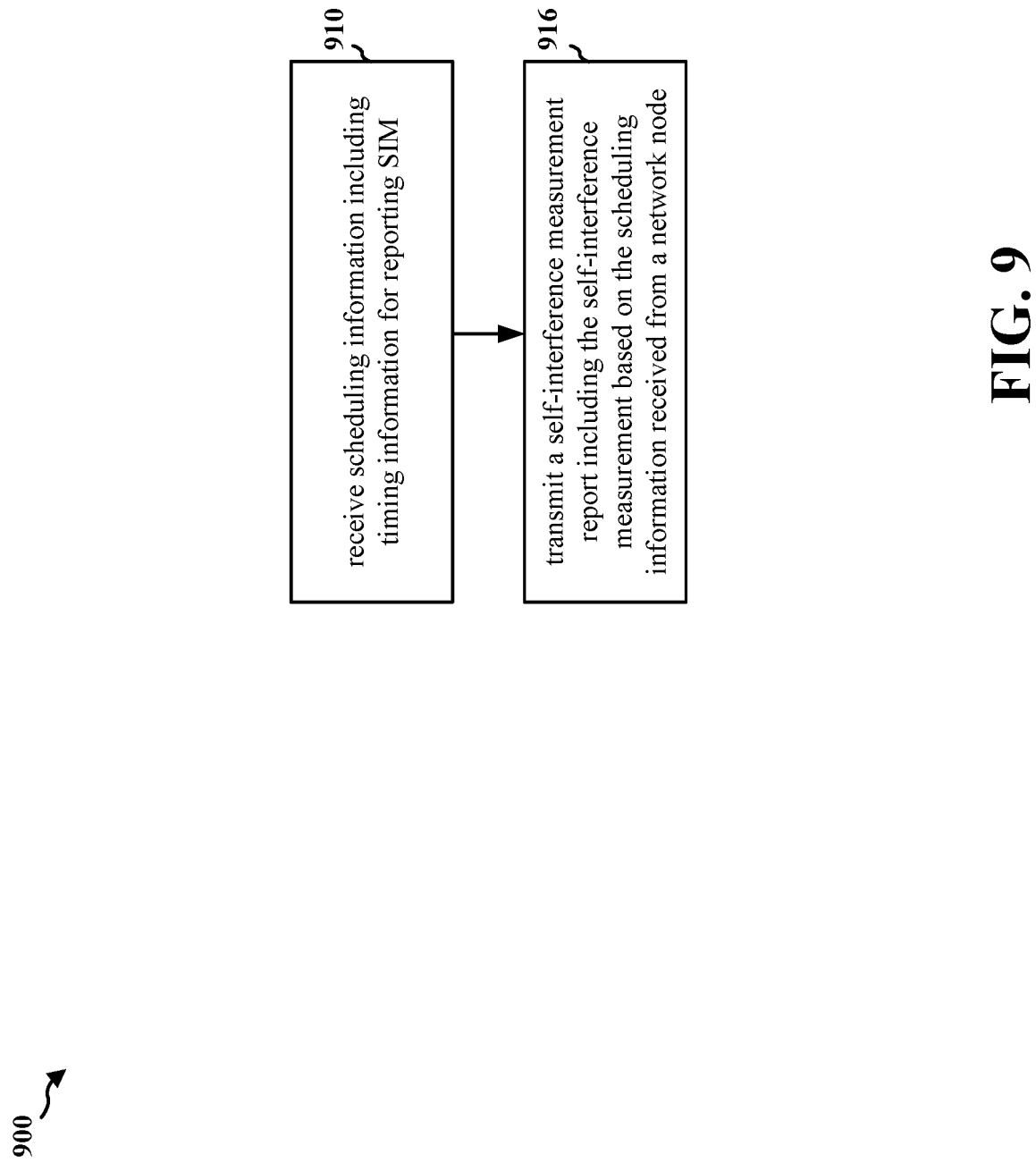
FIG. 9 is a flowchart of a method of wireless communication.

FIG. 9 is a flowchart 900 of a method of wireless communication. The method may be performed by a UE (e.g., the UE 104/610/702; the apparatus 1204). The UE may be connected to a network node (e.g., the first network node 602) and another network node (e.g., the second network node 604) with the mTRP configuration. The UE may receive, from the network node, a scheduling information including timing information for reporting a self-interference measurement, and transmit a self-interference measurement report including the self-interference measurement based on the scheduling information received from a network node. In one aspect, the timing information may instruct the UE to obtain the self-interference measurement report. The UE may transmit a request for the self-interference measurement report, and the self-interference measurement may be triggered or initiated based on the request transmitted by the UE. The UE may also transmit a recommendation or restriction of at least one of a Tx beam/antenna panel for UL transmissions or Rx beam/antenna panel for DL transmissions based on the self-interference measurement reports.

At 910, the UE may receive scheduling information including timing information for reporting a self-interference measurement. Here, the scheduling information may be received based on the request for the self-interference measurement report transmitted to the network node at 908. For example, the network node may include at least a timing information in the scheduling information of the uplink transmission (e.g., one or more PUSCH occasions) to identify the uplink transmission (e.g., a particular PUSCH occasion) subject to the self-interference measuring. Based on the request received from the UE at 908, the network node may schedule at least one of the periodic uplink transmission resources, the aperiodic uplink transmission resources, or the semi-persistent UL transmission resources and include a timing information to instruct the UE to measure the self-interference caused by the scheduled uplink occasion, and report the self-interference measurement to the network node. For example, at 710, the UE 702 may receive scheduling information including timing information for reporting a self-interference measurement. Furthermore, 910 may be performed by the self-interference measurement reporting component 198.

In one aspect, the scheduling information may indicate for the UE to provide the self-interference measurement for one or more of a PUSCH occasion, a dynamic grant scheduling an aperiodic PUSCH, the PUSCH occasion with repetition, the PUSCH occasion without repetition, a slot, or multiple PUSCH occasions within a time window. The network node may indicate a particular PUSCH or a particular slot for the self-interference measurement, which may be configured for an aperiodically scheduled PUSCH with or without repetition. That is, the scheduling information may be a dynamic grant of an aperiodic PUSCH occasions, and the timing information associated with the self-interference measurement may indicate the particular PUSCH among the aperiodic PUSCH occasions. The UE may obtain and report the self-interference report caused by the particular PUSCH indicated by the timing information included in the scheduling information.

In another aspect, the scheduling information may indicate for the UE to provide the self-interference measurement for the multiple PUSCH occasions based on a configured grant scheduling periodic PUSCH, and the indication identifies the time window for measuring the self-interference. The network node may configure the UE to report multiple PUSCH occasions e.g. within a time window for self-interference measurement, which could be periodically scheduled PUSCH with or without repetition. That is, the scheduling information may be a configured grant of a semi-persistent or periodic PUSCH occasions, and the timing information associated with the self-interference measurement may indicate a time window for self-interference measurement. The UE may obtain and report the self-interference report caused by one or more PUSCH occasions within the time window indicated by the timing information associated with the self-interference measurement included in the scheduling information.

In another aspect, the scheduling information may include RX QCL information for the self-interference measurement, and the RX beam may be associated with the Rx QCL information. Here, the Rx QCL information may be associated with at least one of a DG DCI or an RRC DL beam configuration. The scheduling information may or may not configure information of Rx QCL associated with the self-interference measurement. The Rx QCL information associated with the self-interference measurement may indicate the Rx beam to be used for the self-interference measurement, and therefore, the Rx QCL information may indicate the at least one antenna panel that the self-interference is measured.

In one option, the scheduling information may configure information of Rx QCL associated with the self-interference measurement. Based on the Rx QCL information associated with the self-interference measurement, the UE may obtain the self-interference measurement report and transmit the self-interference measurement report to the network node. That is, the UE may measure the self-interference caused by the uplink transmission (e.g., the particular PUSCH occasion) at the antenna panel associated with the Rx beam corresponding to the Rx QCL indicated by the scheduling information.

In another option, the scheduling information may not configure information of Rx QCL associated with the self-interference measurement. Based on the scheduling information not including the Rx QCL information associated with the self-interference measurement, the UE may determine at least one antenna panel to measure the self-interference, and obtain the self-interference measurement report based on the uplink transmission (e.g., the particular PUSCH occasion) indicated by the timing information of the scheduling information.

At 916, the UE may transmit a self-interference measurement report including the self-interference measurement based on the scheduling information received from a network node at 910. The network node may receive a self-interference measurement report including the self-interference measurement based on the scheduling information received from the network node at 910. In case the scheduling information received at 910 may not configure information of Rx QCL associated with the self-interference measurement, for each measured UL resource, the UE may add an indication or specify a Rx beam QCL info for self-interference measurement. That is, the UE may include an indication of the QCL information of the Rx beam used to measure the self-interference measurement. The UE may include, for each self-interference measurement of the PUSCH occasions, the QCL information of the Rx beam used to measure the corresponding self-interference measurement in the self-interference measurement report. For example, the indication of the QCL information of the Rx beam may include a DG DCI or an DL beam configuration. For example, at 716, the UE 702 may transmit a self-interference measurement report including the self-interference measurement based on the scheduling information received from a network node 704 at 710. Furthermore, 916 may be performed by a self-interference measurement reporting component 198.

Figure 10:
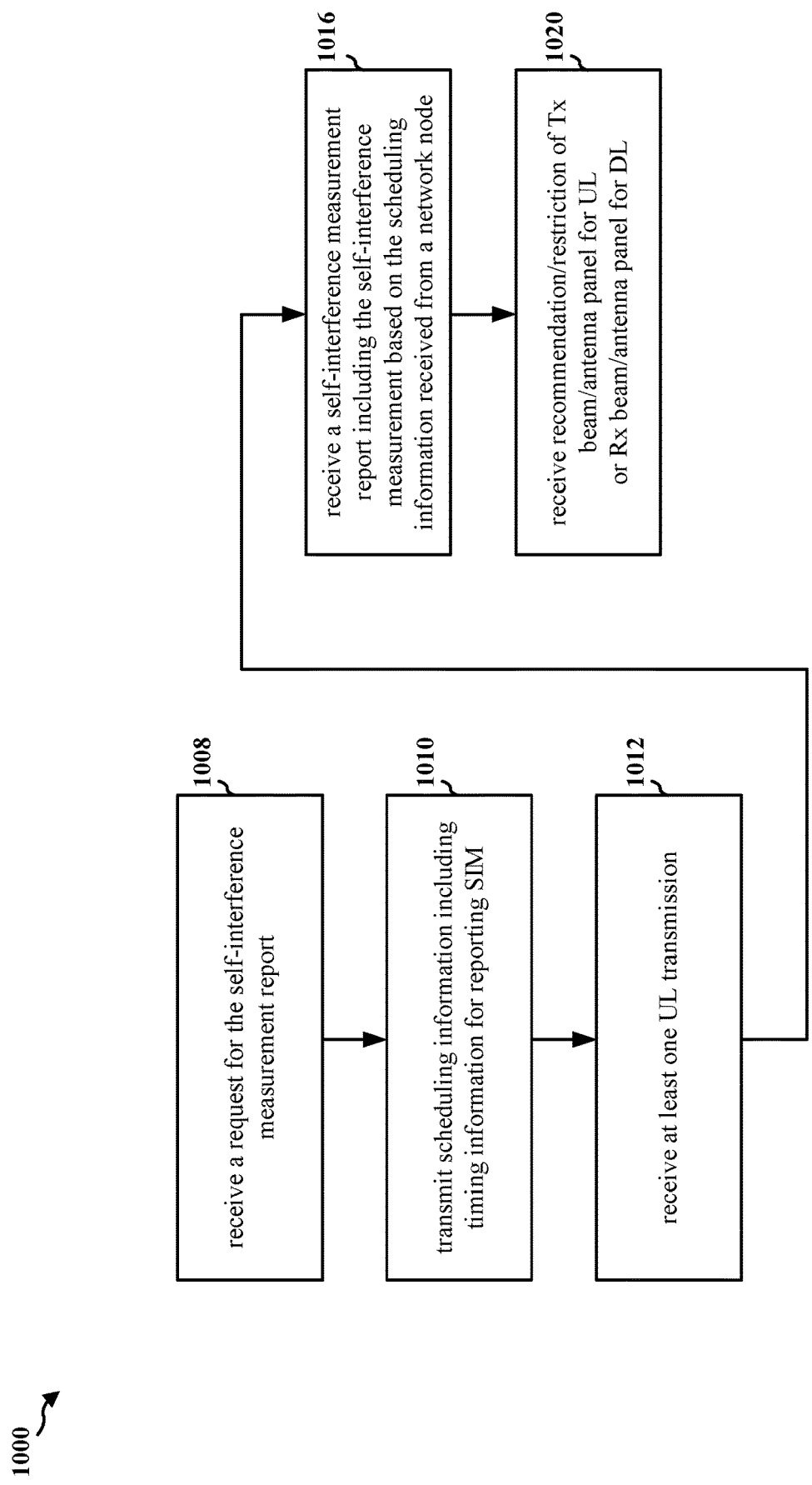
FIG. 10 is a flowchart of a method of wireless communication.

FIG. 10 is a flowchart 1000 of a method of wireless communication. The method may be performed by a network node (e.g., the base station 102/602/704; the network entity 1302/1460). Here, the network node may be a TRP, and a UE may be connected to the network node (e.g., the first network node 602) and another network node (e.g., the second network node 604) with the mTRP configuration. The network node may transmit, to the UE, a scheduling information including timing information for reporting a self-interference measurement, and receive a self-interference measurement report including the self-interference measurement based on the scheduling information received from a network node. The network node may receive a request for the self-interference measurement report from the UE, and the self-interference measurement may be triggered or initiated based on the request received from the UE. The network node may also transmit a recommendation or restriction of at least one of a Tx beam/antenna panel for UL transmissions or Rx beam/antenna panel for DL transmissions based on the self-interference measurement reports. The network node may receive the self-interference measurement report from the UE and control the scheduling of the uplink transmission via the network node to reduce or minimize the self-interference caused at the UE and improve the network throughput of the downlink signal to the UE.

At 1008, the network node may receive a request for the self-interference measurement report prior to transmitting the scheduling information. That is, the UE may transmit a request for the self-interference measurement, and the network node may configure the scheduling information instructing the self-interference measurement based on the request for the self-interference measurement received from the UE. For example, the UE may request the uplink transmissions for measuring the self-interference to be one of a periodic uplink transmission resources, an aperiodic uplink transmission resources, or a semi-persistent UL transmission resources (e.g., MAC-CE activated). For example, at 708, the network node 704 may receive a request for the self-interference measurement report prior to transmitting the scheduling information. Furthermore, 1008 may be performed by the self-interference measurement report configuring component 199.

In one aspect, the request for the self-interference measurement report may request one or more of periodic resources for the self-interference measurement, aperiodic resources for the self-interference measurement, a semi-persistent resources for the self-interference measurement, a first measurement of a first beam or a first panel that is dedicated for uplink, a second measurement of a second beam or a second panel that is dedicated for downlink, or a third measurement of a third beam or a third panel that is for the uplink and the downlink. That is, the UE may identify or indicate at least one of an uplink beam/panel or a downlink beam/panel, and the network node may schedule the uplink transmission occasion subject to the self-interference measurement or indicate the Rx beam/antenna panel for measuring the self-interference caused by the scheduled uplink transmission occasion. In one example, the UE may indicate at least one recommended Tx beam/antenna panel for transmitting the uplink transmission (e.g., the PUSCH occasion) subject to the self-interference measurement or at least one Tx beam/antenna panel not recommended for transmitting the uplink transmission (e.g., the PUSCH occasion) subject to the self-interference measurement. In another example, the UE may indicate at least one recommended Rx beam/antenna panel for measuring the self-interference measurement caused by the uplink transmission (e.g., the PUSCH occasion) subject to the self-interference measurement or at least one Rx beam/antenna panel not recommended for measuring the self-interference measurement caused by the uplink transmission (e.g., the PUSCH occasion) subject to the self-interference measurement.

In another aspect, the request for the self-interference measurement report may indicate at least one sub-band or component carrier. That is, the uplink transmissions and the receive transmissions may be configured for certain sub-band(s) or certain component carrier(s), and the UE may request for the self-interference measurement and further indicate that the request be configured for the certain sub-band(s) or the certain component carrier(s) that may be relevant to the self-interference.

In another aspect, the request for the self-interference measurement report may include a recommendation or a restriction of at least one of a Tx beam/antenna panel to transmit at least one uplink transmission, or a Rx beam/antenna panel to obtain the self-interference measurement. Based on the request for the self-interference measurement report received from the UE, the network node may configure the UE to obtain the self-interference measurement report that may be most relevant to the actual data transmission environment.

In one example, the recommendation or the restriction of the at least one of the Tx beam/antenna panel or the Rx beam/antenna panel may be based on previous measurements of a plurality of Tx beams/antenna panels including the Tx beam/antenna panel or a plurality of Rx beams/antenna panels including the Rx beam/antenna panel. That is, based on the previous measurements of the Rx and Tx beams/antenna panels, the UE may have certain understanding of the Rx beams/antenna panels and the Tx beams/antenna panels with the respective network nodes, and the UE may indicate the network node of the at least one Tx or Rx beam/antenna panel or a pair of Tx and Rx beams/antenna panels that may be most likely or least likely to be used for the uplink and/or downlink transmissions. By indicating the at least one Tx or Rx beam/antenna panel or a pair of Tx and Rx beams/antenna panels recommended or not recommended for the self-interference measurement report based on or derived from previous measurements of the beams/antenna panels, the network node and the UE may obtain the self-interference measurement report that may be most relevant to the actual data transmission environment.

In another example, the recommendation or the restriction of at least one of the Tx beam/antenna panel to transmit the at least one uplink transmission or the Rx beam/antenna panel to obtain the self-interference measurement may be estimated using a ML algorithm. The ML algorithm may be trained to estimate the at least one Tx or Rx beam/antenna panel or a pair of Tx and Rx beams/antenna panels that may be most likely or least likely to be used for the uplink and/or downlink transmissions based on various network conditions (e.g., previous measurements of the beams/antenna panels) at the UE.

At 1010, the network node may transmit scheduling information for a UE, scheduling information including timing information for reporting a self-interference measurement. Here, the scheduling information may be received based on the request for the self-interference measurement report transmitted to the network node at 1008. For example, the network node may include at least a timing information in the scheduling information of the uplink transmission (e.g., one or more PUSCH occasions) to identify the uplink transmission (e.g., a particular PUSCH occasion) subject to the self-interference measuring. Based on the request received from the UE at 1008, the network node may schedule at least one of the periodic uplink transmission resources, the aperiodic uplink transmission resources, or the semi-persistent UL transmission resources and include a timing information to instruct the UE to measure the self-interference caused by the scheduled uplink occasion, and report the and report the self-interference measurement to the network node. For example, at 710, the network node 704 may transmit scheduling information for a UE 702, scheduling information including timing information for reporting a self-interference measurement. Furthermore, 1010 may be performed by the self-interference measurement report configuring component 199.

In one aspect, the scheduling information may indicate for the UE to provide the self-interference measurement for one or more of a PUSCH occasion, a dynamic grant scheduling an aperiodic PUSCH, the PUSCH occasion with repetition, the PUSCH occasion without repetition, a slot, or multiple PUSCH occasions within a time window. The network node may indicate a particular PUSCH or a particular slot for the self-interference measurement, which may be configured for an aperiodically scheduled PUSCH with or without repetition. That is, the scheduling information may be a dynamic grant of an aperiodic PUSCH occasions, and the timing information associated with the self-interference measurement may indicate the particular PUSCH among the aperiodic PUSCH occasions. The UE may obtain and report the self-interference report caused by the particular PUSCH indicated by the timing information included in the scheduling information.

In another aspect, the scheduling information may indicate for the UE to provide the self-interference measurement for the multiple PUSCH occasions based on a configured grant scheduling periodic PUSCH, and the indication identifies the time window for measuring the self-interference. The network node may configure the UE to report multiple PUSCH occasions e.g. within a time window for self-interference measurement, which could be periodically scheduled PUSCH with or without repetition. That is, the scheduling information may be a configured grant of a semi-persistent or periodic PUSCH occasions, and the timing information associated with the self-interference measurement may indicate a time window for self-interference measurement. The UE may obtain and report the self-interference report caused by one or more PUSCH occasions within the time window indicated by the timing information associated with the self-interference measurement included in the scheduling information.

In another aspect, the scheduling information may include RX QCL information for the self-interference measurement, and the RX beam may be associated with the Rx QCL information. Here, the Rx QCL information may be associated with at least one of a DG DCI or an RRC DL beam configuration. The scheduling information may or may not configure information of Rx QCL associated with the self-interference measurement. The Rx QCL information associated with the self-interference measurement may indicate the Rx beam to be used for the self-interference measurement, and therefore, the Rx QCL information may indicate the at least one antenna panel that the self-interference is measured.

In one option, the scheduling information may configure information of Rx QCL associated with the self-interference measurement. Based on the Rx QCL information associated with the self-interference measurement, the UE may obtain the self-interference measurement report and transmit the self-interference measurement report to the network node. That is, the UE may measure the self-interference caused by the uplink transmission (e.g., the particular PUSCH occasion) at the antenna panel associated with the Rx beam corresponding to the Rx QCL indicated by the scheduling information.

In another option, the scheduling information may not configure information of Rx QCL associated with the self-interference measurement. Based on the scheduling information not including the Rx QCL information associated with the self-interference measurement, the UE may determine at least one antenna panel to measure the self-interference, and obtain the self-interference measurement report based on the uplink transmission (e.g., the particular PUSCH occasion) indicated by the timing information of the scheduling information.

At 1012, the network node may receive at least one uplink transmission. The UE may have at least two antenna panels: a first antenna panel configured to communicate with the network node and a second antenna panel configured to communicate with the another network node. The first UE may concurrently transmit an uplink signal to the network node while receiving a downlink signal from the another network node. The UE may experience self-interference as a result of the first signal and the second signal being communicated simultaneously. For example, the uplink signal transmitted by the UE's transmitter may be leaked to (or be received by) the UE's receiver, and the UE may experience self-interference at the receiving antenna receiving the downlink signal from the another network node, the self-interference caused by some of the uplink signal transmitted to the first base station. For example, at 712, the network node 704 may receive at least one uplink transmission. Furthermore, 1012 may be performed by the self-interference measurement report configuring component 199.

At 1016, the network node may receive a self-interference measurement report including the self-interference measurement based on the scheduling information received from the network node at 1010. In case the scheduling information received at 1010 may not configure information of Rx QCL associated with the self-interference measurement, for each measured UL resource, the UE may add an indication or specify a Rx beam QCL info for self-interference measurement. That is, the UE may include an indication of the QCL information of the Rx beam used to measure the self-interference measurement. The UE may include, for each self-interference measurement of the PUSCH occasions, the QCL information of the Rx beam used to measure the corresponding self-interference measurement in the self-interference measurement report. For example, the indication of the QCL information of the Rx beam may include a DG DCI or an DL beam configuration. For example, at 716, the network node 704 may receive a self-interference measurement report including the self-interference measurement based on the scheduling information received from the network node 704 at 710. Furthermore, 1016 may be performed by a self-interference measurement report configuring component 199.

At 1020, the network node may receive a recommendation or a restriction of at least one of a Tx beam/antenna panel for uplink transmissions or a Rx beam/antenna panel for downlink transmissions based on the self-interference measurement report. For example, at 720, the network node 704 may receive a recommendation or a restriction of at least one of a Tx beam/antenna panel for uplink transmissions or a Rx beam/antenna panel for downlink transmissions based on the self-interference measurement report. Furthermore, 1020 may be performed by the self-interference measurement report configuring component 199.

The recommendation or the restriction of the at least one of the Tx beam/antenna panel or the Rx beam/antenna panel may further include at least one information associated with the at least one of the Tx beam/antenna panel or the Rx beam/antenna panel, the at least one information includes at least one of BWP ID, CC ID, used measurement timing scheme, at least one self-interference previously measured at one or more symbols prior, or a time window for applying the recommendation or the restriction at one or more symbols later. That is, based on the outcome of the self-interference measurements, the UE may obtain an understanding of the network environment and the self-interferences caused by the FD operation. In one example, the UE may transmit a recommendation of certain information associated with the network configuration based on the outcome of the self-interference report. In another example, the UE may have an ML algorithm trained to estimate the recommended network configuration based on the outcome of the self-interference measurement report, and transmit the recommendation of certain information associated with the network configuration estimated by the ML algorithm at 818.

In one example, the UE may provide an indication of recommended and/or restricted beams or beam pairs for the UE to operate in FD mode, and the network node may configure the UE with the beams or beam pairs to operate in the FD mode based on the recommended and/or restricted beams or beam pairs indicated by the UE. The indication of the recommended and/or restricted beam or beam pairs may be based on the self-interference measurement report obtained by the UE.

In another example, the UE may further indicate additional information associated with each of the recommended and/or restricted beams or beam pairs. For example, the UE may further indicate the following information associated with each of the recommended and/or restricted beams or beam pairs: a bandwidth part (BWP) identifier (ID) or a component carrier ID associated with each of the recommended and/or restricted beams or beam pairs; a timing scheme used for the self-interference measurements (e.g. the measurement timing aligned with the downlink timing or the uplink self-interference Rx timing); a number of slots or symbols prior to the current time that the self-interference was measured (e.g., indicating that the self-interference was measured M slots/symbols prior); or a time window for applying the recommended and/or restricted beams or beam pairs (e.g., indicating that the recommended and/or restricted beams or beam pairs may be applied for future N slots in a time window).

Figure 11:
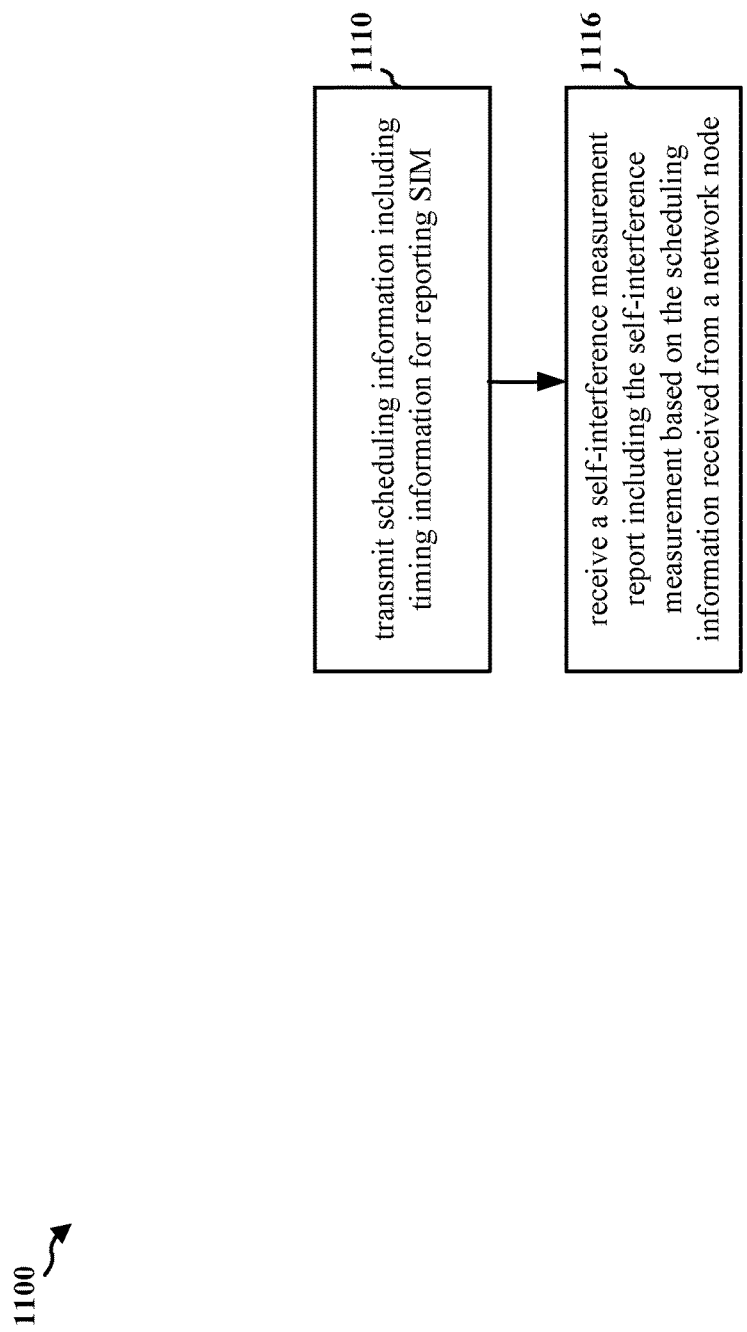
FIG. 11 is a flowchart of a method of wireless communication.

FIG. 11 is a flowchart 1100 of a method of wireless communication. The method may be performed by a network node (e.g., the base station 102/602/704; the network entity 1302/1460). Here, the network node may be a TRP, and a UE may be connected to the network node (e.g., the first network node 602) and another network node (e.g., the second network node 604) with the mTRP configuration. The network node may transmit, to the UE, a scheduling information including timing information for reporting a self-interference measurement, and receive a self-interference measurement report including the self-interference measurement based on the scheduling information received from a network node. The network node may receive a request for the self-interference measurement report from the UE, and the self-interference measurement may be triggered or initiated based on the request received from the UE. The network node may also transmit a recommendation or restriction of at least one of a Tx beam/antenna panel for UL transmissions or Rx beam/antenna panel for DL transmissions based on the self-interference measurement reports. The network node may receive the self-interference measurement report from the UE and control the scheduling of the uplink transmission via the network node to reduce or minimize the self-interference caused at the UE and improve the network throughput of the downlink signal to the UE.

At 1110, the network node may transmit scheduling information for a UE, scheduling information including timing information for reporting a self-interference measurement. Here, the scheduling information may be received based on the request for the self-interference measurement report transmitted to the network node. For example, the network node may include at least a timing information in the scheduling information of the uplink transmission (e.g., one or more PUSCH occasions) to identify the uplink transmission (e.g., a particular PUSCH occasion) subject to the self-interference measuring. Based on the request received from the UE, the network node may schedule at least one of the periodic uplink transmission resources, the aperiodic uplink transmission resources, or the semi-persistent UL transmission resources and include a timing information to instruct the UE to measure the self-interference caused by the scheduled uplink occasion, and report the self-interference measurement to the network node. For example, at 710, the network node 704 may transmit scheduling information for a UE 702, scheduling information including timing information for reporting a self-interference measurement. Furthermore, 1110 may be performed by the self-interference measurement report configuring component 199.

In one aspect, the scheduling information may indicate for the UE to provide the self-interference measurement for one or more of a PUSCH occasion, a dynamic grant scheduling an aperiodic PUSCH, the PUSCH occasion with repetition, the PUSCH occasion without repetition, a slot, or multiple PUSCH occasions within a time window. The network node may indicate a particular PUSCH or a particular slot for the self-interference measurement, which may be configured for an aperiodically scheduled PUSCH with or without repetition. That is, the scheduling information may be a dynamic grant of an aperiodic PUSCH occasions, and the timing information associated with the self-interference measurement may indicate the particular PUSCH among the aperiodic PUSCH occasions. The UE may obtain and report the self-interference report caused by the particular PUSCH indicated by the timing information included in the scheduling information.

In another aspect, the scheduling information may indicate for the UE to provide the self-interference measurement for the multiple PUSCH occasions based on a configured grant scheduling periodic PUSCH, and the indication identifies the time window for measuring the self-interference. The network node may configure the UE to report multiple PUSCH occasions e.g. within a time window for self-interference measurement, which could be periodically scheduled PUSCH with or without repetition. That is, the scheduling information may be a configured grant of a semi-persistent or periodic PUSCH occasions, and the timing information associated with the self-interference measurement may indicate a time window for self-interference measurement. The UE may obtain and report the self-interference report caused by one or more PUSCH occasions within the time window indicated by the timing information associated with the self-interference measurement included in the scheduling information.

In another aspect, the scheduling information may include RX QCL information for the self-interference measurement, and the RX beam may be associated with the Rx QCL information. Here, the Rx QCL information may be associated with at least one of a DG DCI or an RRC DL beam configuration. The scheduling information may or may not configure information of Rx QCL associated with the self-interference measurement. The Rx QCL information associated with the self-interference measurement may indicate the Rx beam to be used for the self-interference measurement, and therefore, the Rx QCL information may indicate the at least one antenna panel that the self-interference is measured.

In one option, the scheduling information may configure information of Rx QCL associated with the self-interference measurement. Based on the Rx QCL information associated with the self-interference measurement, the UE may obtain the self-interference measurement report and transmit the self-interference measurement report to the network node. That is, the UE may measure the self-interference caused by the uplink transmission (e.g., the particular PUSCH occasion) at the antenna panel associated with the Rx beam corresponding to the Rx QCL indicated by the scheduling information.

In another option, the scheduling information may not configure information of Rx QCL associated with the self-interference measurement. Based on the scheduling information not including the Rx QCL information associated with the self-interference measurement, the UE may determine at least one antenna panel to measure the self-interference, and obtain the self-interference measurement report based on the uplink transmission (e.g., the particular PUSCH occasion) indicated by the timing information of the scheduling information.

At 1116, the network node may receive a self-interference measurement report including the self-interference measurement based on the scheduling information received from the network node at 1110. In case the scheduling information received at 1110 may not configure information of Rx QCL associated with the self-interference measurement, for each measured UL resource, the UE may add an indication or specify a Rx beam QCL info for self-interference measurement. That is, the UE may include an indication of the QCL information of the Rx beam used to measure the self-interference measurement. The UE may include, for each self-interference measurement of the PUSCH occasions, the QCL information of the Rx beam used to measure the corresponding self-interference measurement in the self-interference measurement report. For example, the indication of the QCL information of the Rx beam may include a DG DCI or an DL beam configuration. For example, at 716, the network node 704 may receive a self-interference measurement report including the self-interference measurement based on the scheduling information received from the network node 704 at 710. Furthermore, 1116 may be performed by a self-interference measurement report configuring component 199.

Figure 12:
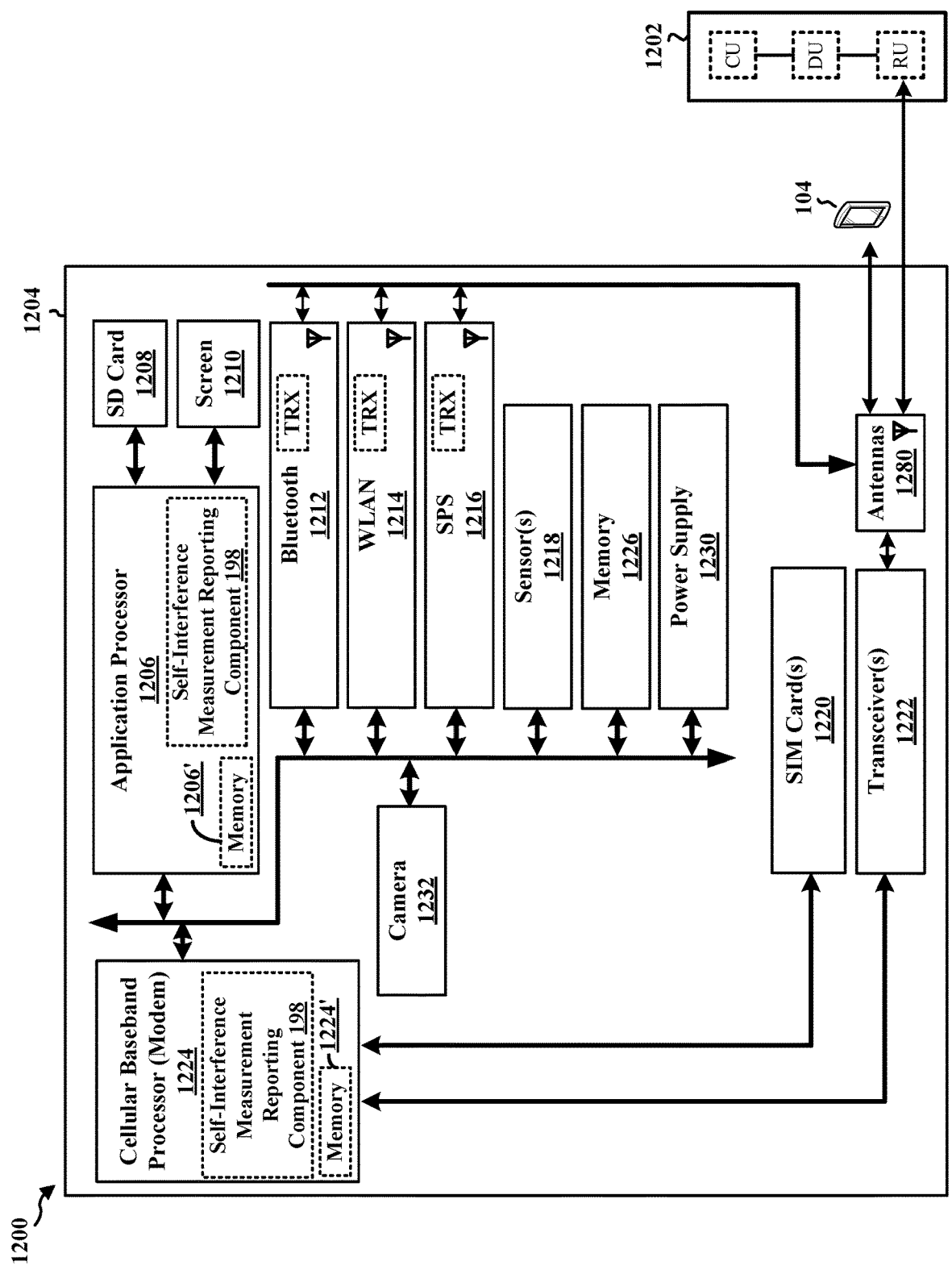
FIG. 12 is a diagram illustrating an example of a hardware implementation for an example apparatus and/or network entity.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include a cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor 1224 communicates through the transceiver(s) 1222 via one or more antennas 1280 with the UE 104 and/or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described supra. The computer-readable medium/memory may also be used for storing data that is manipulated by the cellular baseband processor 1224/application processor 1206 when executing software. The cellular baseband processor 1224/application processor 1206 may be a component of the UE 350 and may include the memory 360 and/or at least one of the TX processor 368, the RX processor 356, and the controller/processor 359. In one configuration, the apparatus 1204 may be a processor chip (modem and/or application) and include just the cellular baseband processor 1224 and/or the application processor 1206, and in another configuration, the apparatus 1204 may be the entire UE (e.g., see 350 of FIG. 3) and include the additional modules of the apparatus 1204.

As discussed supra, the self-interference measurement reporting component 198 is configured to receive scheduling information including timing information for reporting a self-interference measurement, and transmit a self-interference measurement report including the self-interference measurement based on the scheduling information received from a network node. The self-interference measurement reporting component 198 may be within the cellular baseband processor 1224, the application processor 1206, or both the cellular baseband processor 1224 and the application processor 1206. The self-interference measurement reporting component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 and/or the application processor 1206, includes means for receiving scheduling information including timing information for reporting a self-interference measurement, and means for transmitting a self-interference measurement report including the self-interference measurement based on the scheduling information received from a network node. In one configuration, the scheduling information indicates for the UE to provide the self-interference measurement for one or more of a PUSCH occasion, a dynamic grant scheduling an aperiodic PUSCH, the PUSCH occasion with repetition, the PUSCH occasion without repetition, a slot, or multiple PUSCH occasions within a time window. In one configuration, the scheduling information indicates for the UE to provide the self-interference measurement for the multiple PUSCH occasions based on a configured grant scheduling periodic PUSCH, and the indication identifies the time window for measuring the self-interference. In one configuration, the apparatus 1204, and in particular the cellular baseband processor 1224 and/or the application processor 1206, further includes means for transmitting at least one uplink transmission at the UE, and means for measuring self-interference of the uplink transmission using at least one Rx beam at the UE and during a time indicated by the scheduling information. In one configuration, the scheduling information includes RX QCL information for the self-interference measurement, and the RX beam is associated with the Rx QCL information. In one configuration, the Rx QCL information is associated with at least one of a DG DCI or a RRC DL beam configuration. In one configuration, the apparatus 1204, and in particular the cellular baseband processor 1224 and/or the application processor 1206, further includes means for transmitting a request for the self-interference measurement report to the network node prior to receiving the scheduling information, where the scheduling information is received based on the request for the self-interference measurement report transmitted to the network node. In one configuration, the request for the self-interference measurement report requests one or more of periodic resources for the self-interference measurement, aperiodic resources for the self-interference measurement, a semi-persistent resources for the self-interference measurement, a first measurement of a first beam or a first panel that is dedicated for uplink, a second measurement of a second beam or a second panel that is dedicated for downlink, or a third measurement of a third beam or a third panel that is for the uplink and the downlink.

In one configuration, the request for the self-interference measurement report indicates at least one sub-band or component carrier. In one configuration, the request for the self-interference measurement report includes a recommendation or a restriction of at least one of a Tx beam/antenna panel to transmit at least one uplink transmission, or a Rx beam/antenna panel to obtain the self-interference measurement. In one configuration, the recommendation or the restriction of the at least one of the Tx beam/antenna panel or the Rx beam/antenna panel is based on previous measurements of a plurality of Tx beams/antenna panels including the Tx beam/antenna panel or a plurality of Rx beams/antenna panels including the Rx beam/antenna panel. In one configuration, the apparatus 1204, and in particular the cellular baseband processor 1224 and/or the application processor 1206, further includes means for estimating the recommendation or the restriction of the at least one of the Tx beam/antenna panel or the Rx beam/antenna panel using a ML algorithm. In one configuration, the apparatus 1204, and in particular the cellular baseband processor 1224 and/or the application processor 1206, further includes means for transmitting a recommendation or a restriction of at least one of a Tx beam/antenna panel for uplink transmissions or a Rx beam/antenna panel for downlink transmissions based on the self-interference measurement report. In one configuration, the apparatus 1204, and in particular the cellular baseband processor 1224 and/or the application processor 1206, further includes means for estimating the recommendation or the restriction of the at least one of the Tx beam/antenna panel for the uplink transmissions or the Rx beam/antenna panel for the downlink transmissions based on the self-interference measurement report using a ML algorithm. In one configuration, the recommendation or the restriction of the at least one of the Tx beam/antenna panel or the Rx beam/antenna panel further includes at least one information associated with the at least one of the Tx beam/antenna panel or the Rx beam/antenna panel, the at least one information includes at least one of BWP ID, CC ID, used measurement timing scheme, at least one self-interference previously measured at one or more symbols prior, or a time window for applying the recommendation or the restriction at one or more symbols later. The means may be the self-interference measurement reporting component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

Figure 13:
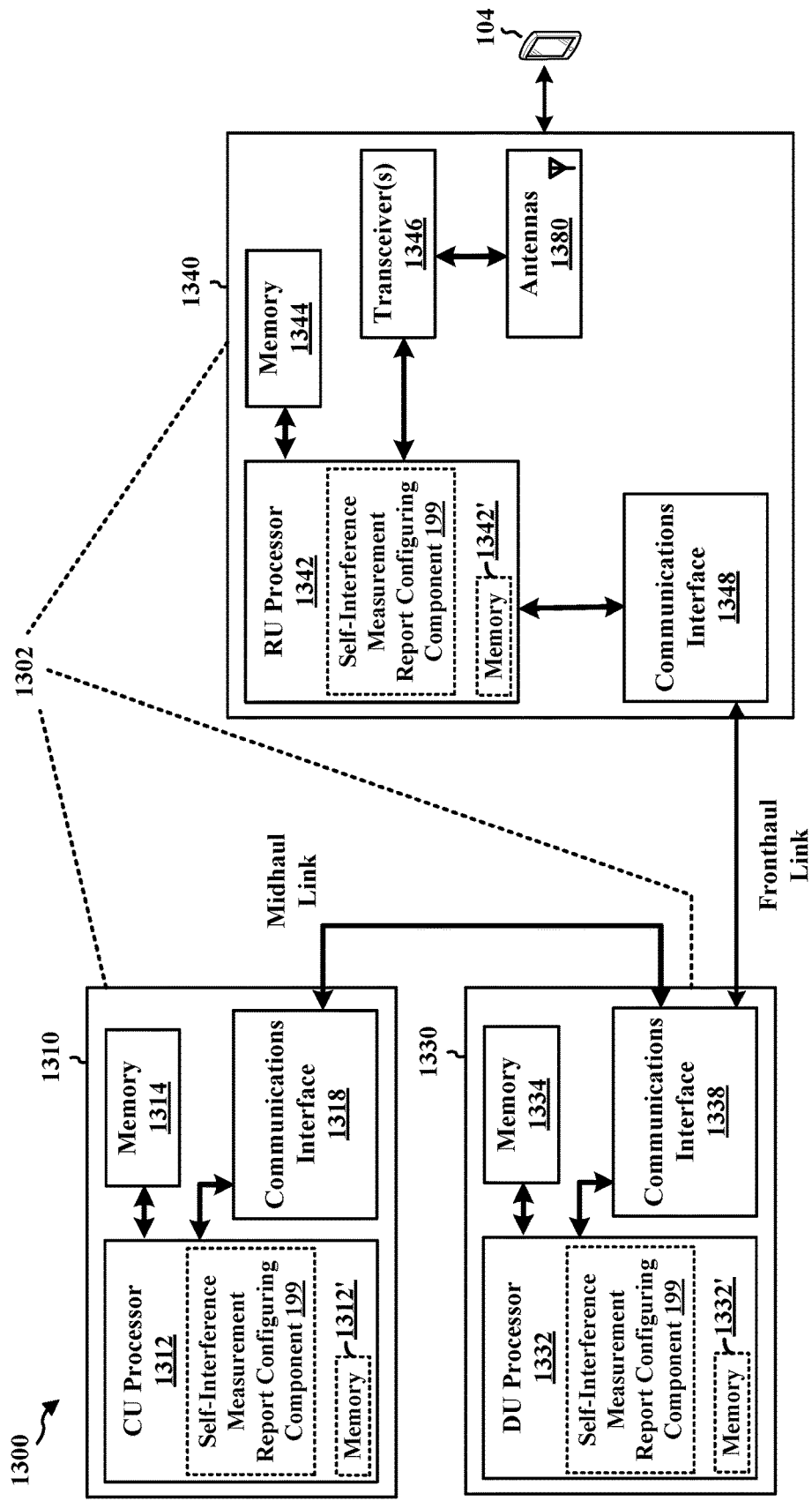
FIG. 13 is a diagram illustrating an example of a hardware implementation for an example network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the self-interference measurement report configuring component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include a CU processor 1312. The CU processor 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include a DU processor 1332. The DU processor 1332 may include on-chip memory 1332'. In some aspects, the DU 1330 may further include additional memory modules 1334 and a communications interface 1338. The DU 1330 communicates with the RU 1340 through a fronthaul link. The RU 1340 may include an RU processor 1342. The RU processor 1342 may include on-chip memory 1342'. In some aspects, the RU 1340 may further include additional memory modules 1344, one or more transceivers 1346, antennas 1380, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the self-interference measurement report configuring component 199 is configured to transmit scheduling information for a UE, scheduling information including timing information for reporting a self-interference measurement, and receive a self-interference measurement report including the self-interference measurement based on the scheduling information received from the network node. The self-interference measurement report configuring component 199 may be within one or more processors of one or more of the CU 1310, DU 1330, and the RU 1340. The self-interference measurement report configuring component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1302 may include a variety of components configured for various functions. In one configuration, the network entity 1302 includes means for transmitting scheduling information for a user UE, scheduling information including timing information for reporting a self-interference measurement, and means for receiving a self-interference measurement report including the self-interference measurement based on the scheduling information received from the network node. In one configuration, the scheduling information indicates for the UE to provide the self-interference measurement for one or more of a PUSCH occasion, a dynamic grant scheduling an aperiodic PUSCH, the PUSCH occasion with repetition, the PUSCH occasion without repetition, a slot, or multiple PUSCH occasion within a time window. In one configuration, the scheduling information indicates for the UE to provide the self-interference measurement for the multiple PUSCH occasions based on a configured grant scheduling periodic PUSCH, and the indication identifies the time window for measuring the self-interference. In one configuration, the network entity 1302 further includes means for receiving at least one uplink transmission at the UE, where the scheduling information includes Rx QCL information associated with the self-interference measurement, and the Rx QCL information is associated with a Rx beam used for measuring the self-interference of the uplink transmission. In one configuration, the Rx QCL information is associated with at least one of a DG DCI or a RRC DL beam configuration. In one configuration, the network entity 1302 further includes means for receiving a request for the self-interference measurement report prior to transmitting the scheduling information, where the scheduling information is transmitted based on the request for the self-interference measurement report received. In one configuration, the request for the self-interference measurement report requests one or more of periodic resources for the self-interference measurement, aperiodic resources for the self-interference measurement, a semi-persistent resources for the self-interference measurement, a first measurement of a first beam or a first panel that is dedicated for uplink, a second measurement of a second beam or a second panel that is dedicated for downlink, or a third measurement of a third beam or a third panel that is for the uplink and the downlink. In one configuration, the request for the self-interference measurement report indicates at least one sub-band or component carrier. In one configuration, the request for the self-interference measurement report includes a recommendation or a restriction of at least one of a Tx beam/antenna panel to transmit at least one uplink transmission, or a Rx beam/antenna panel to obtain the self-interference measurement. In one configuration, the network entity 1302 further includes means for receiving a recommendation or a restriction of at least one of a Tx beam/antenna panel for uplink transmissions or a Rx beam/antenna panel for downlink transmissions based on the self-interference measurement report. In one configuration, the recommendation or the restriction of the at least one of the Tx beam/antenna panel or the Rx beam/antenna panel further includes at least one information associated with the at least one of the Tx beam/antenna panel or the Rx beam/antenna panel, the at least one information includes at least one of BWP ID, CC ID, used measurement timing scheme, at least one self-interference previously measured at one or more symbols prior, or a time window for applying the recommendation or the restriction at one or more symbols later. The means may be the self-interference measurement report configuring component 199 of the network entity 1302 configured to perform the functions recited by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

Figure 14:
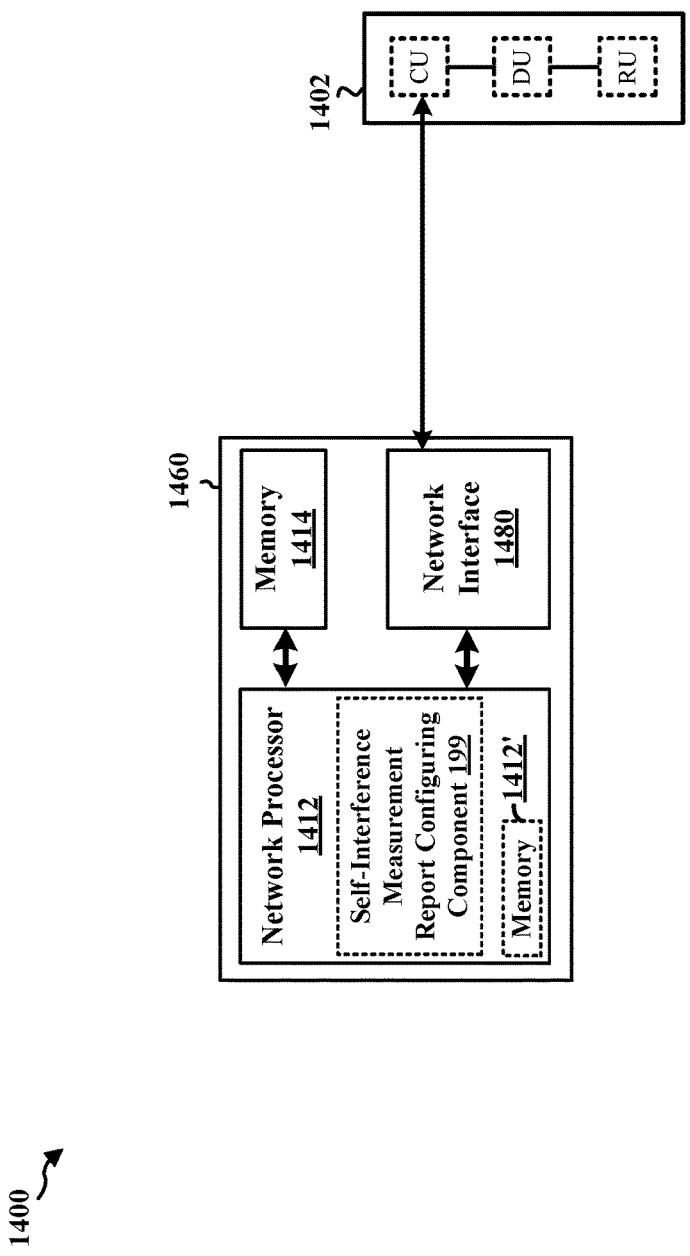
FIG. 14 is a diagram illustrating an example of a hardware implementation for an example network entity.

FIG. 14 is a diagram 1400 illustrating an example of a hardware implementation for a network entity 1460. In one example, the network entity 1460 may be within the core network 120. The network entity 1460 may include a network processor 1412. The network processor 1412 may include on-chip memory 1412'. In some aspects, the network entity 1460 may further include additional memory modules 1414. The network entity 1460 communicates via the network interface 1480 directly (e.g., backhaul link) or indirectly (e.g., through a RIC) with the CU 1402. The on-chip memory 1412' and the additional memory modules 1414 may each be considered a computer-readable medium/memory. Each computer-readable medium/memory may be non-transitory. The processor 1412 is responsible for general processing, including the execution of software stored on the computer-readable medium/memory. The software, when executed by the corresponding processor(s) causes the processor(s) to perform the various functions described supra.

The computer-readable medium/memory may also be used for storing data that is manipulated by the processor(s) when executing software.

As discussed supra, the self-interference measurement report configuring component 199 is configured to transmit scheduling information for a UE, scheduling information including timing information for reporting a self-interference measurement, and receive a self-interference measurement report including the self-interference measurement based on the scheduling information received from the network node. The self-interference measurement report configuring component 199 may be within the processor 1412. The self-interference measurement report configuring component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1460 may include a variety of components configured for various functions. In one configuration, the network entity 1460 includes means for transmitting scheduling information for a user UE, scheduling information including timing information for reporting a self-interference measurement, and means for receiving a self-interference measurement report including the self-interference measurement based on the scheduling information received from the network node. In one configuration, the scheduling information indicates for the UE to provide the self-interference measurement for one or more of a PUSCH occasion, a dynamic grant scheduling an aperiodic PUSCH, the PUSCH occasion with repetition, the PUSCH occasion without repetition, a slot, or multiple PUSCH occasion within a time window. In one configuration, the scheduling information indicates for the UE to provide the self-interference measurement for the multiple PUSCH occasions based on a configured grant scheduling periodic PUSCH, and the indication identifies the time window for measuring the self-interference. In one configuration, the network entity 1460 further includes means for receiving at least one uplink transmission at the UE, where the scheduling information includes Rx QCL information associated with the self-interference measurement, and the Rx QCL information is associated with a Rx beam used for measuring the self-interference of the uplink transmission. In one configuration, the Rx QCL information is associated with at least one of a DG DCI or a RRC DL beam configuration. In one configuration, the network entity 1460 further includes means for receiving a request for the self-interference measurement report prior to transmitting the scheduling information, where the scheduling information is transmitted based on the request for the self-interference measurement report received. In one configuration, the request for the self-interference measurement report requests one or more of periodic resources for the self-interference measurement, aperiodic resources for the self-interference measurement, a semi-persistent resources for the self-interference measurement, a first measurement of a first beam or a first panel that is dedicated for uplink, a second measurement of a second beam or a second panel that is dedicated for downlink, or a third measurement of a third beam or a third panel that is for the uplink and the downlink. In one configuration, the request for the self-interference measurement report indicates at least one sub-band or component carrier. In one configuration, the request for the self-interference measurement report includes a recommendation or a restriction of at least one of a Tx beam/antenna panel to transmit at least one uplink transmission, or a Rx beam/antenna panel to obtain the self-interference measurement. In one configuration, the network entity 1460 further includes means for receiving a recommendation or a restriction of at least one of a Tx beam/antenna panel for uplink transmissions or a Rx beam/antenna panel for downlink transmissions based on the self-interference measurement report. In one configuration, the recommendation or the restriction of the at least one of the Tx beam/antenna panel or the Rx beam/antenna panel further includes at least one information associated with the at least one of the Tx beam/antenna panel or the Rx beam/antenna panel, the at least one information includes at least one of BWP ID, CC ID, used measurement timing scheme, at least one self-interference previously measured at one or more symbols prior, or a time window for applying the recommendation or the restriction at one or more symbols later. The means may be the self-interference measurement report configuring component 199 of the network entity 1460 configured to perform the functions recited by the means.

In some aspects of the current disclosure, the UE may receive scheduling information including timing information for reporting a self-interference measurement, and transmit a self-interference measurement report including the self-interference measurement based on the scheduling information received from a network node. The network node may transmit scheduling information for a UE, scheduling information including timing information for reporting a self-interference measurement, and receive a self-interference measurement report including the self-interference measurement based on the scheduling information received from the network node. The UE may transmit a request for the self-interference measurement report to the network node prior to receiving the scheduling information, where the scheduling information is received based on the request for the self-interference measurement report transmitted to the network node.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including receiving scheduling information including timing information for reporting a self-interference measurement, and transmitting a self-interference measurement report including the self-interference measurement based on the scheduling information received from a network node.

Aspect 2 is the method of aspect 1, where the scheduling information indicates for the UE to provide the self-interference measurement for one or more of a PUSCH occasion, a dynamic grant scheduling an aperiodic PUSCH, the PUSCH occasion with repetition, the PUSCH occasion without repetition, a slot, or multiple PUSCH occasions within a time window.

Aspect 3 is the method of aspect 2, where the scheduling information indicates for the UE to provide the self-interference measurement for the multiple PUSCH occasions based on a configured grant scheduling periodic PUSCH, and the indication identifies the time window for measuring the self-interference.

Aspect 4 is the method of any of aspects 1 to 3, further including transmitting at least one uplink transmission at the UE, and measuring self-interference of the uplink transmission using at least one Rx beam at the UE and during a time indicated by the scheduling information.

Aspect 5 is the method of aspect 4, where the scheduling information includes RX QCL information for the self-interference measurement, and the RX beam is associated with the Rx QCL information.

Aspect 6 is the method of aspect 5, where the Rx QCL information is associated with at least one of a DG DCI or a RRC DL beam configuration.

Aspect 7 is the method of any of aspects 1 to 6, further including transmitting a request for the self-interference measurement report to the network node prior to receiving the scheduling information, where the scheduling information is received based on the request for the self-interference measurement report transmitted to the network node.

Aspect 8 is the method of aspects 7, where the request for the self-interference measurement report requests one or more of periodic resources for the self-interference measurement, aperiodic resources for the self-interference measurement, a semi-persistent resources for the self-interference measurement, a first measurement of a first beam or a first panel that is dedicated for uplink, a second measurement of a second beam or a second panel that is dedicated for downlink, or a third measurement of a third beam or a third panel that is for the uplink and the downlink.

Aspect 9 is the method of any of aspects 7 and 8, where the request for the self-interference measurement report indicates at least one sub-band or component carrier.

Aspect 10 is the method of any of aspects 7 to 9, where the request for the self-interference measurement report includes a recommendation or a restriction of at least one of a Tx beam/antenna panel to transmit at least one uplink transmission, or a Rx beam/antenna panel to obtain the self-interference measurement.

Aspect 11 is the method of aspect 10, where the recommendation or the restriction of the at least one of the Tx beam/antenna panel or the Rx beam/antenna panel is based on previous measurements of a plurality of Tx beams/antenna panels including the Tx beam/antenna panel or a plurality of Rx beams/antenna panels including the Rx beam/antenna panel.

Aspect 12 is the method of any of aspects 10 and 11, further including estimating the recommendation or the restriction of the at least one of the Tx beam/antenna panel or the Rx beam/antenna panel using a ML algorithm.

Aspect 13 is the method of any of aspects 1 to 12, further including transmitting a recommendation or a restriction of at least one of a Tx beam/antenna panel for uplink transmissions or a Rx beam/antenna panel for downlink transmissions based on the self-interference measurement report.

Aspect 14 is the method of aspect 13, further including estimating the recommendation or the restriction of the at least one of the Tx beam/antenna panel for the uplink transmissions or the Rx beam/antenna panel for the downlink transmissions based on the self-interference measurement report using a ML algorithm.

Aspect 15 is the method of any of aspects 13 and 14, where the recommendation or the restriction of the at least one of the Tx beam/antenna panel or the Rx beam/antenna panel further includes at least one information associated with the at least one of the Tx beam/antenna panel or the Rx beam/antenna panel, the at least one information includes at least one of BWP ID, CC ID, used measurement timing scheme, at least one self-interference previously measured at one or more symbols prior, or a time window for applying the recommendation or the restriction at one or more symbols later.

Aspect 16 is an apparatus for wireless communication including at least one processor coupled to a memory and configured to implement any of aspects 1 to 15, further including a transceiver coupled to the at least one processor.

Aspect 17 is an apparatus for wireless communication including means for implementing any of aspects 1 to 15.

Aspect 18 is a non-transitory computer-readable medium storing computer executable code, where the code when executed by a processor causes the processor to implement any of aspects 1 to 15.

Aspect 19 is a method of wireless communication at a network node, including transmitting scheduling information for a user UE, scheduling information including timing information for reporting a self-interference measurement, and receiving a self-interference measurement report including the self-interference measurement based on the scheduling information received from the network node.

Aspect 20 is the method of aspect 19, where the scheduling information indicates for the UE to provide the self-interference measurement for one or more of a PUSCH occasion, a dynamic grant scheduling an aperiodic PUSCH, the PUSCH occasion with repetition, the PUSCH occasion without repetition, a slot, or multiple PUSCH occasion within a time window.

Aspect 21 is the method of aspect 20, where the scheduling information indicates for the UE to provide the self-interference measurement for the multiple PUSCH occasions based on a configured grant scheduling periodic PUSCH, and the indication identifies the time window for measuring the self-interference.

Aspect 22 is the method of any of aspects 19 to 21, further including receiving at least one uplink transmission at the UE, where the scheduling information includes Rx QCL information associated with the self-interference measurement, and the Rx QCL information is associated with a Rx beam used for measuring the self-interference of the uplink transmission.

Aspect 23 is the method of aspect 22, where the Rx QCL information is associated with at least one of a DG DCI or a RRC DL beam configuration.

Aspect 24 is the method of any of aspects 19 to 23, further including receiving a request for the self-interference measurement report prior to transmitting the scheduling information, where the scheduling information is transmitted based on the request for the self-interference measurement report received.

Aspect 25 is the method of aspect 24, where the request for the self-interference measurement report requests one or more of periodic resources for the self-interference measurement, aperiodic resources for the self-interference measurement, a semi-persistent resources for the self-interference measurement, a first measurement of a first beam or a first panel that is dedicated for uplink, a second measurement of a second beam or a second panel that is dedicated for downlink, or a third measurement of a third beam or a third panel that is for the uplink and the downlink.

Aspect 26 is the method of any of aspects 24 and 25, where the request for the self-interference measurement report indicates at least one sub-band or component carrier.

Aspect 27 is the method of any of aspects 24 to 26, where the request for the self-interference measurement report includes a recommendation or a restriction of at least one of a Tx beam/antenna panel to transmit at least one uplink transmission, or a Rx beam/antenna panel to obtain the self-interference measurement.

Aspect 28 is the method of any of aspects 19 to 27, further including receiving a recommendation or a restriction of at least one of a Tx beam/antenna panel for uplink transmissions or a Rx beam/antenna panel for downlink transmissions based on the self-interference measurement report.

Aspect 29 is the method of aspect 28, where the recommendation or the restriction of the at least one of the Tx beam/antenna panel or the Rx beam/antenna panel further includes at least one information associated with the at least one of the Tx beam/antenna panel or the Rx beam/antenna panel, the at least one information includes at least one of BWP ID, CC ID, used measurement timing scheme, at least one self-interference previously measured at one or more symbols prior, or a time window for applying the recommendation or the restriction at one or more symbols later.

Aspect 30 is an apparatus for wireless communication including at least one processor coupled to a memory and configured to implement any of aspects 19 to 29, further including a transceiver coupled to the at least one processor.

Aspect 31 is an apparatus for wireless communication including means for implementing any of aspects 19 to 29.

Aspect 32 is a non-transitory computer-readable medium storing computer executable code, where the code when executed by a processor causes the processor to implement any of aspects 19 to 29.

What is claimed is:

1. An apparatus for wireless communication at a user equipment (UE), comprising:
   memory; and
   at least one processor coupled to the memory and, based at least in part on information stored in the memory, the at least one processor is configured to:
      receive scheduling information including timing information for reporting a self-interference measurement in which the UE measures interference from an uplink transmission of the UE, wherein the scheduling information indicates for the UE to provide the self-interference measurement that is measured for one or more of:
         a physical uplink shared channel (PUSCH) occasion,
         a dynamic grant scheduling an aperiodic PUSCH,
         the PUSCH occasion with repetition,
         the PUSCH occasion without repetition,
         a slot, or
         multiple PUSCH occasions within a time window; and
      transmit a self-interference measurement report including the self-interference measurement based on the scheduling information received from a network node.

2. The apparatus of claim 1, further comprising a transceiver coupled to the at least one processor.

3. The apparatus of claim 1, wherein the scheduling information indicates for the UE to provide the self-interference measurement for the multiple PUSCH occasions based on a configured grant scheduling periodic PUSCH, and the scheduling information identifies the time window for measuring self-interference.

4. The apparatus of claim 1, wherein the at least one processor is further configured to:
   transmit at least one uplink transmission at the UE; and
   measure self-interference of the at least one uplink transmission using at least one receive (RX) beam at the UE and during a time indicated by the scheduling information.

5. An apparatus for wireless communication at a user equipment (UE), comprising:
   memory; and
   at least one processor coupled to the memory and, based at least in part on information stored in the memory, the at least one processor is configured to:
      receive scheduling information including timing information for reporting a self-interference measurement, wherein the scheduling information includes receive (RX) quasi co-location (QCL) information for the self-interference measurement;
      transmit at least one uplink transmission at the UE;
      measure self-interference of the at least one uplink transmission using at least one RX beam at the UE based on the scheduling information and during a time indicated by the scheduling information, and the at least one RX beam is associated with the Rx QCL information; and
      transmit a self-interference measurement report including the self-interference measurement based on the scheduling information received from a network node.

6. The apparatus of claim 5, wherein the Rx QCL information is associated with at least one of a dynamic grant (DG) downlink (DL) control information (DCI) or a radio resource control (RRC) DL beam configuration.

7. The apparatus of claim 5, further comprising a transceiver coupled to the at least one processor.

8. The apparatus of claim 1, wherein the at least one processor is further configured to:
   transmit a request for the self-interference measurement report to the network node prior to receiving the scheduling information,
   wherein the scheduling information is received based on the request for the self-interference measurement report transmitted to the network node.

9. The apparatus of claim 8, wherein the request for the self-interference measurement report requests one or more of:
   periodic resources for the self-interference measurement;
   aperiodic resources for the self-interference measurement;
   a semi-persistent resources for the self-interference measurement;
   a first measurement of a first beam or a first panel that is dedicated for uplink;
   a second measurement of a second beam or a second panel that is dedicated for downlink; or
   a third measurement of a third beam or a third panel that is for the uplink and the downlink.

10. The apparatus of claim 8, wherein the request for the self-interference measurement report indicates at least one sub-band or component carrier.

11. An apparatus for wireless communication at a user equipment (UE), comprising:
    memory; and
    at least one processor coupled to the memory and, based at least in part on information stored in the memory, the at least one processor is configured to:
       transmit a request for a self-interference measurement report to a network node, wherein the request for the self-interference measurement report includes a recommendation or a restriction of at least one of:
          a transmit (Tx) beam or a Tx antenna panel to transmit at least one uplink transmission; or
          a Rx beam or a Rx antenna panel to obtain a self-interference measurement;
       receive scheduling information including timing information for reporting the self-interference measurement, wherein the scheduling information is received based on the request for the self-interference measurement report transmitted to the network node; and transmit the self-interference measurement report including the self-interference measurement based on the scheduling information received from the network node.

12. The apparatus of claim 11, wherein the recommendation or the restriction of the at least one of the Tx beam or the Tx antenna panel or the Rx beam or the Rx antenna panel is based on previous measurements of a plurality of Tx beams or Tx antenna panels including the Tx beam or the Tx antenna panel or a plurality of Rx beams or Rx antenna panels including the Rx beam or the Rx antenna panel.

13. The apparatus of claim 10, wherein the at least one processor is further configured to:
estimate the recommendation or the restriction of the at least one of the Tx beam, the Tx antenna panel, the Rx beam, or the Rx antenna panel using a machine learning (ML) algorithm.

14. The apparatus of claim 11, further comprising a transceiver coupled to the at least one processor, wherein the recommendation or the restriction is for at least one of the Tx beam or the Tx antenna panel to transmit the at least one uplink transmission.

15. The apparatus of claim 11, wherein the recommendation or the restriction is for at least one of the Rx beam or the Rx antenna panel to obtain the self-interference measurement.

16. An apparatus for wireless communication at a user equipment (UE), comprising:
memory; and
at least one processor coupled to the memory and, based at least in part on information stored in the memory, the at least one processor is configured to:
receive scheduling information including timing information for reporting a self-interference measurement; and
transmit a self-interference measurement report including the self-interference measurement based on the scheduling information received from a network node; and
transmit, based on the self-interference measurement report, a recommendation or a restriction of at least one of:
a transmit (Tx) beam for uplink transmissions,
a Tx antenna panel for the uplink transmissions,
an Rx beam for downlink transmissions, or
an Rx antenna panel for the downlink transmissions.

17. The apparatus of claim 16, wherein the at least one processor is further configured to:
estimate the recommendation or the restriction of the at least one of the Tx beam for the uplink transmissions, the Tx antenna panel for the uplink transmissions, the Rx beam for the downlink transmissions, or the Rx antenna panel for the downlink transmissions based on the self-interference measurement report using a machine learning (ML) algorithm.

18. The apparatus of claim 16, wherein the recommendation or the restriction of the at least one of the Tx beam for the uplink transmissions, the Tx antenna panel for the uplink transmissions, the Rx beam for the downlink transmissions, or the Rx antenna panel for the downlink transmissions further includes at least one information associated with the at least one of the Tx beam for the uplink transmissions, the Tx antenna panel for the uplink transmissions, the Rx beam for the downlink transmissions, or the Rx antenna panel for the downlink transmissions, the at least one information includes at least one of:
bandwidth part (BWP) identifier (ID);
component carrier (CC) ID;
used measurement timing scheme;
at least one self-interference previously measured at one or more symbols prior; or
a time window for applying the recommendation or the restriction at one or more subsequent symbols.

19. The apparatus of claim 16, further comprising a transceiver coupled to the at least one processor, wherein the at least one processor is further configured to:
transmit, via the transceiver, at least one uplink transmission at the UE; and
measure self-interference of the at least one uplink transmission using at least one receive (RX) beam at the UE and during a time indicated by the scheduling information.

20. An apparatus for wireless communication at a network node, comprising:
memory; and
at least one processor coupled to the memory and, based at least in part on information stored in the memory, the at least one processor is configured to:
transmit scheduling information for a user equipment (UE), wherein the scheduling information includes timing information for reporting a self-interference measurement of an uplink transmission of the UE, and wherein the scheduling information indicates for the UE to provide the self-interference measurement that is measured for one or more of:
a physical uplink shared channel (PUSCH) occasion,
a dynamic grant scheduling an aperiodic PUSCH,
the PUSCH occasion with repetition,
the PUSCH occasion without repetition,
a slot, or
multiple PUSCH occasion within a time window; and
receive a self-interference measurement report including the self-interference measurement based on the scheduling information received from the network node.

21. The apparatus of claim 20, wherein the scheduling information indicates for the UE to provide the self-interference measurement for the multiple PUSCH occasions based on a configured grant scheduling periodic PUSCH, and the scheduling information identifies the time window for measuring the self-interference.

22. The apparatus of claim 20, wherein the at least one processor is further configured to:
receive a request for the self-interference measurement report prior to transmitting the scheduling information, wherein the scheduling information is transmitted based on the request for the self-interference measurement report received.

23. The apparatus of claim 22, wherein the request for the self-interference measurement report requests one or more of:
periodic resources for the self-interference measurement;
aperiodic resources for the self-interference measurement;
a semi-persistent resources for the self-interference measurement;
a first measurement of a first beam or a first panel that is dedicated for uplink;
a second measurement of a second beam or a second panel that is dedicated for downlink; or
a third measurement of a third beam or a third panel that is for the uplink and the downlink.

24. The apparatus of claim 22, wherein the request for the self-interference measurement report indicates at least one sub-band or component carrier.

25. An apparatus for wireless communication at a network node, comprising:
   memory; and
   at least one processor coupled to the memory and, based at least in part on information stored in the memory, the at least one processor is configured to:
   transmit scheduling information for a user equipment (UE), wherein the scheduling information includes timing information for reporting a self-interference measurement, and wherein the scheduling information includes receive (RX) quasi co-location (QCL) information associated with the self-interference measurement; and
   receive a self-interference measurement report including the self-interference measurement based on the scheduling information received from the network node, wherein the Rx QCL information is associated with a Rx beam used for a self-interference of an uplink transmission reported in the self-interference measurement report.

26. The apparatus of claim 25, wherein the Rx QCL information is associated with at least one of a dynamic grant (DG) downlink (DL) control information (DCI) or a radio resource control (RRC) DL beam configuration.

27. An apparatus for wireless communication at a network node, comprising:
   memory; and
   at least one processor coupled to the memory and, based at least in part on information stored in the memory, the at least one processor is configured to:
   receive a request for a self-interference measurement report, wherein the request for the self-interference measurement report includes a recommendation or a restriction of at least one of:
      a transmit (Tx) beam to transmit at least one uplink transmission,
      a Tx antenna panel to transmit the at least one uplink transmission,
      an Rx beam to obtain a self-interference measurement, or
      an Rx antenna panel to obtain the self-interference measurement;
   transmit scheduling information for a user equipment (UE), wherein the scheduling information includes timing information for reporting a self-interference measurement, wherein the scheduling information is transmitted based on the request for the self-interference measurement report received; and
   receive the self-interference measurement report including the self-interference measurement based on the scheduling information received from the network node.

28. An apparatus for wireless communication at a network node, comprising:
   memory; and
   at least one processor coupled to the memory and, based at least in part on information stored in the memory, the at least one processor is configured to:
   transmit scheduling information for a user equipment (UE), wherein the scheduling information includes timing information for reporting a self-interference measurement;
   receive a self-interference measurement report including the self-interference measurement based on the scheduling information received from the network node; and
   receive, based on the self-interference measurement report, a recommendation or a restriction of at least one of:
      a transmit (Tx) beam for uplink transmissions,
      a Tx antenna panel for the uplink transmissions,
      an Rx beam for downlink transmissions, or
      an Rx antenna panel for the downlink transmissions.

29. The apparatus of claim 28, wherein the recommendation or the restriction of the at least one of the Tx beam, the Tx antenna panel, the Rx beam, or the Rx antenna panel further includes at least one information associated with the at least one of the Tx beam, the Tx antenna panel, the Rx beam, or the Rx antenna panel, and wherein the at least one information includes at least one of:
   bandwidth part (BWP) identifier (ID);
   component carrier (CC) ID;
   used measurement timing scheme;
   at least one self-interference previously measured at one or more symbols prior; or
   a time window for applying the recommendation or the restriction at one or more subsequent symbols.

* * * * *